(12) United States Patent  (10) Patent No.: US 7,768,688 B2
Miyazawa et al.  (45) Date of Patent: Aug. 3, 2010

(54) IMAGE DISPLAY DEVICE, IMAGE DISPLAY METHOD, AND IMAGE DISPLAY PROGRAM

(75) Inventors: Yasunaga Miyazawa, Okaya (JP); Hiroshi Hasegawa, Chino (JP); Hidehito Iisaka, Shiojiri (JP); Hidehiro Akahane, Matsumoto (JP); Takashi Toyooka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 12/213,092

(22) Filed: Jun. 13, 2008

(65) Prior Publication Data

US 2008/0297877 A1 Dec. 4, 2008

Related U.S. Application Data

(63) Continuation of application No. 11/389,080, filed on Mar. 27, 2006, now Pat. No. 7,403,318.

(30) Foreign Application Priority Data

Apr. 1, 2005 (JP) .............................. 2005-105751

(51) Int. Cl.
*G02F 1/03* (2006.01)
(52) U.S. Cl. ........................ 359/242; 359/246; 359/247
(58) Field of Classification Search .................. 359/242
See application file for complete search history.

(56) References Cited

U.S. PATENT DOCUMENTS

| | | | |
|---|---|---|---|
| 7,042,627 B2 | 5/2006 | Maeyama et al. | |
| 7,088,372 B2 | 8/2006 | Yoshida | |
| 7,213,922 B2 | 5/2007 | Suzuki et al. | |
| 2003/0142275 A1 | 7/2003 | Yoshida | |
| 2004/0248022 A1 | 12/2004 | Yoshida et al. | |
| 2005/0088625 A1 | 4/2005 | Imade | |
| 2006/0232502 A1 | 10/2006 | Yoshida | |
| 2006/0290957 A1 | 12/2006 | Kim et al. | |

(Continued)

FOREIGN PATENT DOCUMENTS

CN 1432988 A 7/2003

(Continued)

OTHER PUBLICATIONS

U.S. Office Action in U.S. Appl. No. 12/213,091, mailed Dec. 9, 2009.

*Primary Examiner*—Jordan M. Schwartz
*Assistant Examiner*—James C Jones
(74) *Attorney, Agent, or Firm*—Oliff & Berridge, PLC

(57) ABSTRACT

An image display device having an optical modulation element, which modulates light emitted from a light source according to display information, and displaying a display image based on the display information includes: a unit adjusting the amount of illumination light with respect to light emitted from the light source on the basis of brightness information on the brightness of the display image based on the display information; a color conversion processing unit that performs a color conversion process according to the brightness information with respect to the display information so that the display image can be color-reproduced within a predetermined color space; and a display and driving unit that drives the optical modulation element on the basis of the display information having been subjected to the color conversion process so as to display the display image.

5 Claims, 14 Drawing Sheets

U.S. PATENT DOCUMENTS

2007/0085979 A1 * 4/2007 Berman .................. 353/97
2007/0285345 A1 * 12/2007 Nishino et al. ................ 345/6

FOREIGN PATENT DOCUMENTS

| CN | 1507281 A | 6/2004 |
|---|---|---|
| JP | A 03-179886 | 8/1991 |
| JP | A-2004-012519 | 1/2004 |
| JP | A-2004-325629 | 11/2004 |
| JP | A 2005-107009 | 4/2005 |
| JP | A 2005-107019 | 4/2005 |
| JP | A 2005-221562 | 8/2005 |
| JP | A 2005-221629 | 8/2005 |
| JP | A 2005-257760 | 9/2005 |
| JP | A 2005-257761 | 9/2005 |

* cited by examiner

IMAGE DISPLAY DEVICE, IMAGE DISPLAY METHOD, AND IMAGE DISPLAY PROGRAM

This is a Continuation of application Ser. No. 11/389,080 filed Mar. 27, 2006. The disclosure of the prior application is hereby incorporated by reference herein in its entirety.

BACKGROUND

1. Technical Field

The present invention relates to an image display device, an image display method, and an image display program.

2. Related Art

There has been known a conventional image display device which modulates light emitted from a light source according to display information by using an optical modulation element and displays a display image based on the display information. In particular, in order to realize a liquid crystal display device of which power consumption is low and which is thin, a liquid crystal display device using a liquid crystal light valve as an optical modulation element is under development. In addition, in recent years, as one type of the liquid crystal display devices, a projection type display device (projector) or a rear surface projection type display device (projection TV), which modulates light emitted from a light source according to display information by using a liquid crystal light valve and projects the modulated light toward a screen through a projection lens in an enlarged manner so as to create a projection image (display image) on the screen, is widely used.

In the projection type display device or the rear surface projection type display device, even though the liquid crystal light valve is used as an optical modulation element, the range (dynamic range) of the brightness which can be displayed is narrow due to stray light or optical leakage occurring in various optical elements forming an optical system, and accordingly, it may be difficult to improve the picture quality. For this reason, the following methods have been proposed as a method of extending the dynamic range.

For example, as a first method, there has been proposed a method in which the amount of illumination light illuminated from a light source onto a liquid crystal light valve is controlled (illumination control) according to the average picture level (APL) of display information (picture signal) (for example, refer to JP-A-3-179886).

In addition, for example, as a second method, there has been proposed a gray-scale range change processing method (a so-called black and white extension processing method) in which the gray-scale range of display information is changed by increasing each pixel value (for example, brightness value or RGB value), corresponding to each pixel, included in the display information according to brightness information (for example, brightness value) on the brightness of the display information (picture signal).

In order to create a color projection image, it is general to use a configuration in which a plurality of colored light beams emitted from a light source is modulated according to display information, respectively, so as to form each optical image corresponding to each of the plurality of colored light beams and then the respective optical images are combined.

Here, as a characteristic of a liquid crystal light valve, the transmittance or reflectance of light has a predetermined limitation. In addition, due to the characteristic of the liquid crystal light valve, even when the liquid crystal light valve is driven to realize a black image, some light beams leak. For this reason, in the case of a dark image, for example, even when only an optical image corresponding to an R colored light beam is formed by using a liquid crystal light valve and the brightness values of optical images corresponding to the other GB colored light beams are set to zero, the GB colored light beams leak through the liquid crystal light valve. As a result, the R colored optical image is affected by the other colored light beams and thus the color saturation level of the R colored optical image becomes low. On the other hand, in the first method, when the amount of illumination light is controlled by the illumination control, the amount of the GB colored light beams leaking through the liquid crystal light valve is reduced to the reduced amount of illumination light. As a result, the R colored optical image is not easily affected by the other colored light beams and thus the color saturation level of the R colored optical image becomes high. That is, the color of a projection image obtained when the amount of illumination light is not adjusted is different from that obtained when the amount of illumination light is adjusted. For this reason, when the amount of illumination light is adjusted, there is a problem in that the color of a projection image is changed Furthermore, as another characteristic of a liquid crystal light valve, in many cases, a gray-scale characteristic of the liquid crystal light valve is not linear on the chromaticity coordinate and a color characteristic of the liquid crystal light valve at a predetermined brightness level is different from that of the liquid crystal light valve at another brightness level. For this reason, in the second method, when the gray-scale change process is performed, the color characteristic of the liquid crystal light valve becomes different. That is, since the color of a projection image projected through the liquid crystal light valve becomes different when the gray-scale change process is performed, the above-mentioned problem that the color of the projection image is changed also occurs.

SUMMARY

In advantage of some aspects of the invention is that it provides an image display device capable of reliably maintaining the color of a display image even when the amount of illumination light is adjusted or a gray-scale range change process is performed, an image display method, and an image display program.

According to a first aspect of the invention, an image display device having an optical modulation element, which modulates light emitted from a light source according to display information, and displaying a display image based on the display information includes: a unit adjusting the amount of illumination light with respect to light emitted from the light source on the basis of brightness information on the brightness of the display image based on the display information; a color conversion processing unit that performs a color conversion process according to the brightness information with respect to the display information so that the display image can be color-reproduced within a predetermined color space; and a display and driving unit that drives the optical modulation element on the basis of the display information having been subjected to the color conversion process so as to display the display image.

Here, information on the brightness of a display image based on display information may be used as the brightness information, and it is possible to adopt information set according to a brightness value of display information (picture signal), an RGB value, or the like. In addition, the brightness information may be created by the image display device on the basis of the display information or may be acquired from the outside.

In the invention, the unit adjusting the amount of illumination light adjusts the amount of illumination light emitted from the light source on the basis of the brightness information. In addition, the color conversion processing unit performs the color conversion process according to the brightness information with respect to the display information, that is, a color conversion process according to the amount of illumination light adjusted by the unit adjusting the amount of illumination light so that the display image can be color-reproduced within a predetermined color space. In addition, the display and driving unit drives the optical modulation element on the basis of the display information having been subjected to the color conversion process so as to display the display image. Thereby, even when the amount of illumination light is adjusted by the unit adjusting the amount of illumination light, the color conversion process according to the amount of illumination light with respect to the display information is performed by the color conversion processing unit. As a result, it is possible to offset an effect of the adjustment of the amount of illumination light with respect to the display image and to make the display image color-reproduced within a predetermined color space (a standard color space of sRGB) in both cases in which the amount of illumination light is adjusted and not adjusted. Thus, it is possible to reliably maintain the color of the display image even when the amount of illumination light is adjusted In the invention, preferably, the image display device further includes a gray-scale range change processing unit that performs a gray-scale range change process of changing the gray-scale range of the display information by increasing each pixel value, corresponding to each pixel, included in the display information on the basis of the brightness information. In addition, preferably, the display and driving unit drives the optical modulation element on the basis of the display information having been subjected to the gray-scale range change process and the color conversion process so as to display the display image.

In the invention, for example, when the amount of illumination light is reduced by the gray-scale range change processing unit, it is possible to perform a gray-scale range change process of extending the gray-scale range without changing the peak brightness value of the display image. As a result, the range (dynamic range) of the brightness which can be displayed can also be extended.

Further, in the invention, as described above, since the color conversion processing unit performs the color conversion process according to the adjusted amount of illumination light, that is, a color conversion process according to the adjustment of the amount of illumination light and the gray-scale range change process, with respect to the display information, it is possible to perform the color conversion process, which corresponds to each color characteristic of each optical modulation element (liquid crystal light valve) becoming different due to the gray-scale range change process, with respect to the display information even when the gray-scale range is changed by the gray-scale range change process of the gray-scale range change processing unit. As a result, it is possible to make the display image color-reproduced within a predetermined color space (for example, a standard color space of sRGB). Thus, even when the amount of illumination light is adjusted and the gray-scale range is changed, the color of the display image can be reliably maintained.

Further, according to a second aspect of the invention, an image display device having an optical modulation element, which modulates light emitted from a light source according to display information, and displaying a display image based on the display information includes: a gray-scale range change processing unit that performs a gray-scale range change process of changing the gray-scale range of the display information by increasing each pixel value, corresponding to each pixel, included in the display information on the basis of the brightness information on the brightness of the display image based on the display information; a color conversion processing unit that performs a color conversion process according to the brightness information with respect to the display information so that the display image can be color-reproduced within a predetermined color space; and a display and driving unit that drives the optical modulation element on the basis of the display information having been subjected to the gray-scale range change process and the color conversion process so as to display the display image.

Here, in the same manner as described above, information on the brightness of a display image based on display information may be used as the brightness information, and it is possible to adopt information set according to a brightness value of display information (picture signal), an RGB value, or the like. In addition, the brightness information may be created by the image display device on the basis of the display information or may be acquired from the outside.

In the invention, the gray-scale range change processing unit performs the gray-scale range change process (a so-called black and white extension process) of changing the gray-scale range of the display information by increasing each pixel value, corresponding to each pixel, included in the display information on the basis of the brightness information. In addition, the color conversion processing unit performs a color conversion process according to each color characteristic of each optical modulation element (liquid crystal light valve), which becomes different when the gray-scale range is changed by the gray-scale change process of the gray-scale range change processing unit, so that the display image can be color-reproduced within a predetermined color space. In addition, the display and driving unit drives the optical modulation element on the basis of the display information having been subjected to the gray-scale range change process and the color conversion process so as to display the display image. Thereby, even when the gray-scale range change process (a so-called black and white extension process) is performed by the gray-scale range change processing unit, the color conversion processing unit performs the color conversion process according to each color characteristic of each optical modulation element, which becomes different by the gray-scale range change process, with respect to the display information. As a result, it is possible to offset an effect of the change of the gray-scale range with respect to the display image and to make the display image color-reproduced within a predetermined color space (for example, a standard color space of sRGB) in both cases in which the gray-scale range is changed and not changed. Thus, it is possible to reliably maintain the color of the display image even when the gray-scale range change process is performed.

In the invention, preferably, the image display device further includes a color conversion information storage unit that stores a plurality of conversion tables corresponding to the brightness information, each of the plurality of conversion tables associating each input pixel value corresponding to each color with each output pixel value for making the display image color-reproduced within a predetermined color space in correspondence with each input pixel value. When the color conversion processing unit performs the color conversion process, the color conversion processing unit converts each input pixel value for each color, which corresponds to each pixel, included in the display information into each output pixel value on the basis of one of the plurality of conversion tables corresponding to the brightness information.

Here, it is preferable that a plurality of conversion tables be provided according to brightness information. For example, the number of conversion tables may be equal to the number of processes of changing the gray-scale range or the number of processes of changing the amount of illumination light according to the brightness information, or the number of conversion tables may be less than the number of processes of changing the gray-scale range or the number of processes of changing the amount of illumination light according to the brightness information.

In the invention, the color conversion information storage unit stores the plurality of conversion tables corresponding to the number of processes of changing the amount of illumination light, which is adjusted by the unit adjusting the amount of illumination light according to the brightness information, or the number of processes of changing the gray-scale range changed by the gray-scale range change processing unit, each of the plurality of conversion tables being provided to associate each input pixel value (each RGB input value) corresponding to each color with each output pixel value (each RGB output value) for making the display image color-reproduced within a predetermined color space in correspondence with each input pixel value and to convert each input pixel value (each RGB input value) for each color, corresponding to each pixel, included in the display information into each output pixel value. In addition, when the color conversion processing unit performs the color conversion process, the color conversion processing unit converts each input pixel value into each output pixel value by referring to one of the plurality of conversion tables corresponding to the amount of illumination light adjusted by the unit adjusting the amount of illumination light or the gray-scale range changed by the gray-scale range change processing unit. Thereby, a processing load at a time when the color conversion process is performed can be reduced as compared with a case in which, for example, a color conversion processing unit performs a color conversion process of calculating each RGB output value by an operation using a predetermined color conversion function, and as a result, the color conversion process can be performed quickly.

In the image display device of the invention, preferably, when the color conversion processing unit performs the color conversion process, the color conversion processing unit calculates each output pixel value for making the display image color-reproduced within a predetermined color space by using the brightness information and each input pixel value for each color, which correspond to each pixel, included in the display information on the basis of a color conversion function using the brightness information and each input pixel value for each color as conversion parameters.

In the invention, the color conversion processing unit calculates each output pixel value (each RGB output value) for making the display image color-reproduced within a predetermined color space by using the brightness information corresponding to the display information and each input pixel value (each RGB input value) for each color, which corresponds to each pixel, included in the display information on the basis of the color conversion function using the brightness information and each input pixel value (each RGB input value) for each color as conversion parameters. Thereby, as compared with a case in which, for example, a color conversion processing unit performs a color conversion process of converting each input pixel value into each output pixel value by referring to a conversion table, it is possible to reduce the amount of information required for the color conversion process. As a result, since it is possible to adopt a storage unit having a small storage capacity, it is possible to manufacture the image display device with a low cost.

In addition, in a configuration in which a matrix operation is performed by using a color conversion function, the circuit configuration of, for example, the color conversion processing unit in the image display device can be simplified, and accordingly, the power can be saved and a low manufacturing cost can be realized.

Further, in the image display device of the invention, preferably, the color conversion processing unit performs the color conversion process with respect to the display information such that the display information can also be subjected to a gray-scale characteristic correction process corresponding to a gray-scale characteristic of the optical modulation element.

In the invention, since the color conversion processing unit performs the color conversion process and the gray-scale characteristic correction process ($\gamma$ correction process), it is not necessary to prepare a separate processing unit that performs the gray-scale characteristic correction. As a result, the circuit configuration of the image display device can be simplified, and accordingly, the power can be saved and a low manufacturing cost can be realized.

Furthermore, in the invention, preferably, the image display device further includes a gray-scale characteristic correction processing unit that performs a gray-scale characteristic correction process, which corresponds to a gray-scale characteristic of the optical modulation element, with respect to the display information. In addition, preferably, the gray-scale characteristic correction processing unit performs the gray-scale characteristic correction process corresponding to the brightness information.

In the invention, since the gray-scale characteristic correction processing unit performs the gray-scale characteristic correction process ($\gamma$ correction process), which corresponds to the brightness information, with respect to the display information, it is possible to perform the gray-scale characteristic correction process according to the adjusted amount of illumination light or the changed gray-scale range even when the amount of illumination light is adjusted or the gray-scale range change process is performed. As a result, the color of the display image can be reliably maintained.

In addition, since the gray-scale characteristic correction processing unit is provided separately from the color conversion processing unit, the gray-scale characteristic correction processing unit can have a function of performing the gray-scale characteristic correction process according to gray-scale characteristics of various optical modulation elements as compared with a case in which, for example, the color conversion process and the gray-scale characteristic correction process are performed at the same time by the color conversion processing unit. As a result, the gray-scale characteristic correction process can be reliably performed according to the gray-scale characteristic of an optical modulation element.

According to a third aspect of the invention, an image display method of modulating light emitted from a light source according to display information and displaying a display image based on the display information includes: adjusting the amount of illumination light with respect to light emitted from the light source on the basis of brightness information on the brightness of the display image based on the display information; performing a color conversion process according to the brightness information with respect to the display information so that the display image can be color-reproduced within a predetermined color space; and driving the optical modulation element on the basis of the display information having been subjected to the color conversion process so as to display the display image.

In the invention, since the method is performed by using the image display device described above, the same effects as in the image display device described above is obtained.

Furthermore, according to a fourth aspect of the invention, an image display method of modulating light emitted from a light source according to display information and displaying a display image based on the display information includes: performing a gray-scale range change process of changing the gray-scale range of the display information by increasing each pixel value, corresponding to each pixel, included in the display information on the basis of brightness information on the brightness of the display image based on the display information; performing a color conversion process according to the brightness information with respect to the display information so that the display image can be color-reproduced within a predetermined color space; and driving the optical modulation element on the basis of the display information having been subjected to the gray-scale range change process and the color conversion process so as to display the display image.

In the invention, since the method is performed by using the image display device described above, the same effects as in the image display device described above is obtained.

Furthermore, according to a fifth aspect of the invention, an image display program causes a computer included in an image display device to execute the image display method described above.

In the invention, since the image display program is executed by the computer included in the above-described image display device, the same effects as in the image display device described above is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.

Figure 1:
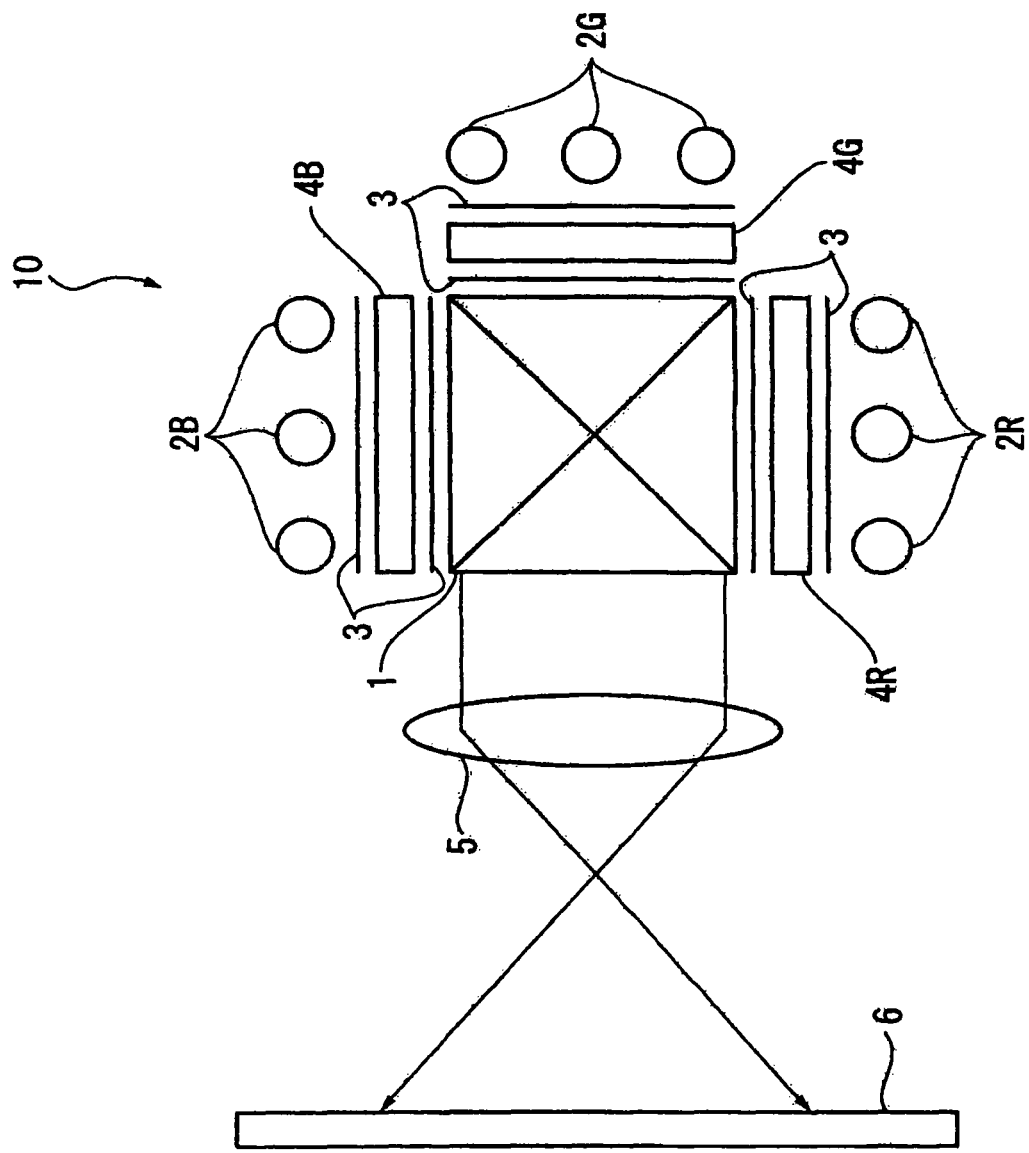
FIG. 1 is a plan view illustrating an optical system of an image display device according to a first embodiment of the invention.
Figure 2:
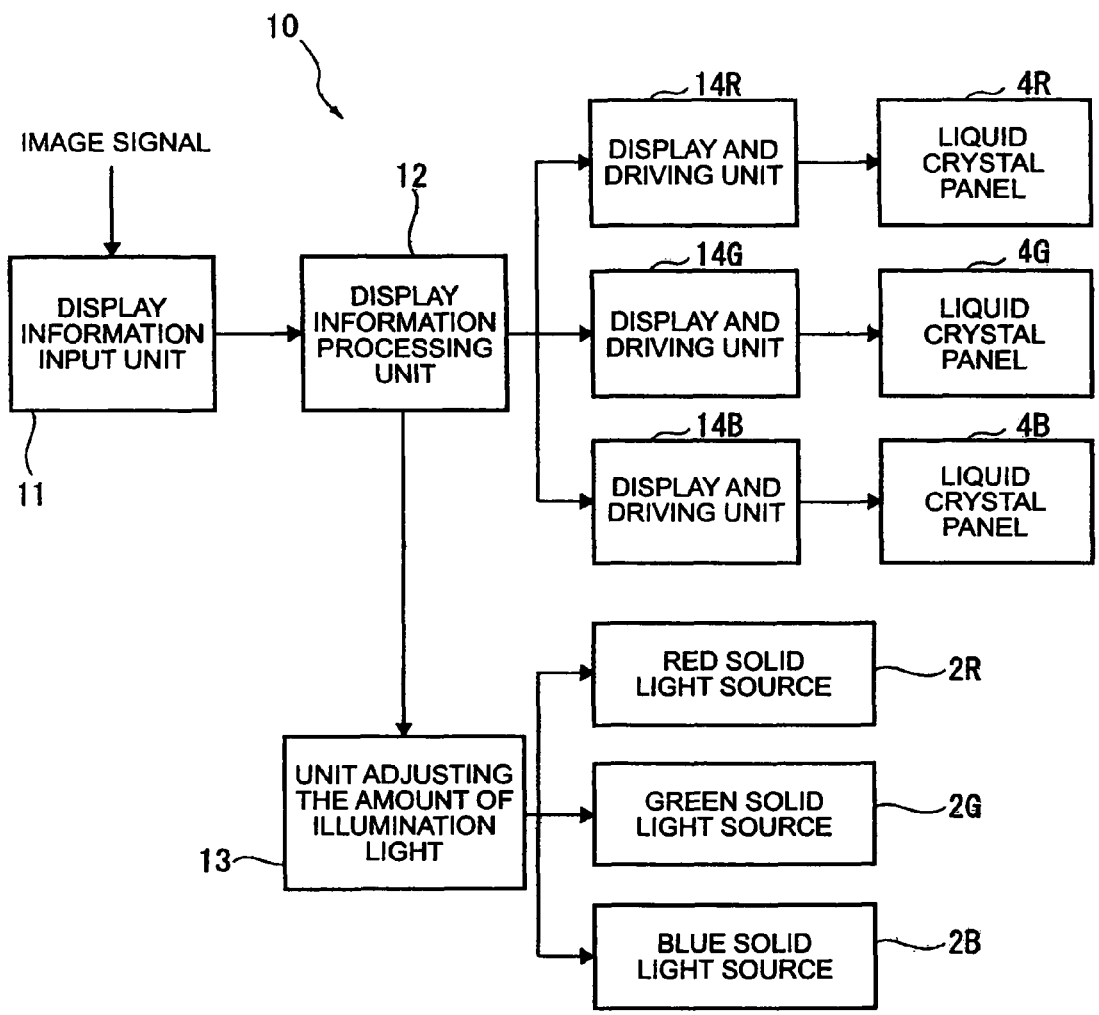
FIG. 2 is a block diagram illustrating the structure of the image display device in the first embodiment.
Figure 3:
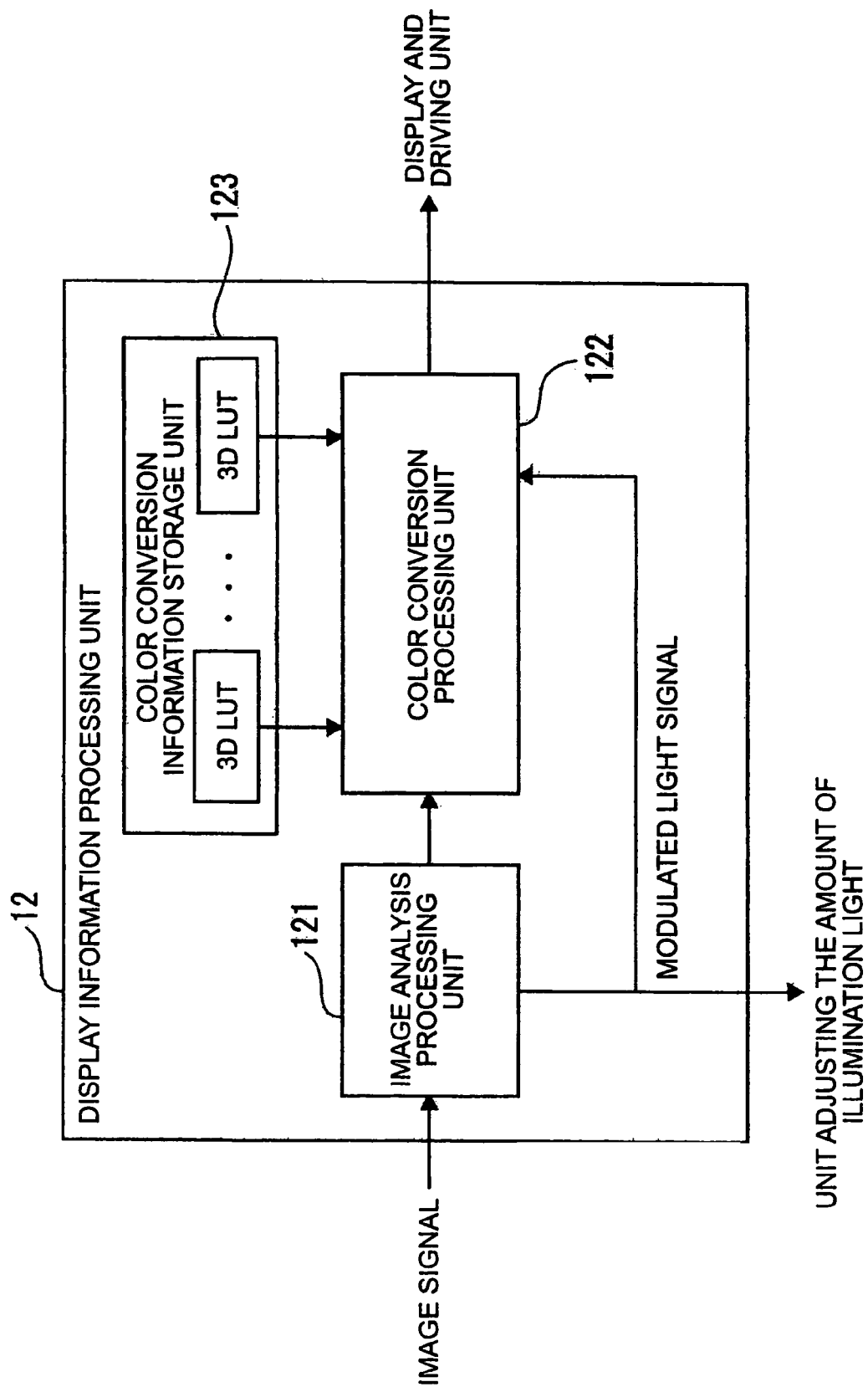
FIG. 3 is a block diagram illustrating the structure of a display information processing unit in the first embodiment.

FIGS. 1 to 3 show a projection type image display device 10 according to the present embodiment. FIG. 1 is a plan view illustrating an optical system of the image display device 10 in which a liquid crystal light valve is used as an optical modulation element and a solid light source (LED (light emitting diode) light source) corresponding to each color of RGB is used to adjust the amount of illumination light with respect to the liquid crystal light valve. FIG. 2 is a block diagram illustrating the structure of the image display device 10. FIG. 3 is a block diagram illustrating the structure of a display information processing unit 12.

Configuration of Optical System of Image Display Device

As shown in FIG. 1, the optical system of the image display device 10 of the present embodiment includes a dichroic prism 1, a red solid light source 2R, a green solid light source 2G, a blue solid light source 2B, a polarizer 3, a liquid crystal panel 4R, a liquid crystal panel 4G, a liquid crystal panel 4B, and a projection lens 5. In addition, each of the liquid crystal panel 4R, 4G, and 4B is mounted with the polarizer 3.

Light emitted from the red solid light source 2R is incident on the dichroic prism 1 through the polarizer 3 and the transmissive liquid crystal panel 4R, light emitted from the green solid light source 2G is incident on the dichroic prism 1 through the polarizer 3 and the transmissive liquid crystal panel 4G, and light emitted from the blue solid light source 2B is incident on the dichroic prism 1 through the polarizer 3 and the transmissive liquid crystal panel 4B. The liquid crystal panels 4R, 4G, and 4B form an optical image as a variation of a polarized state according to a picture signal.

The dichroic prism 1 is formed by bonding four triangular prisms. In the dichroic prism 1, a dichroic multi-layered film for red reflection and a dichroic multi-layered film for blue reflection are vapor-deposited such that inclined surfaces, which are bonded surfaces, of the dichroic prism 1 cross each other in an X shape. Primary colors incident on the dichroic prism 1 are combined into one light beam by the dichroic prism 1 to be then incident on the projection lens 5. Then, optical images formed on the liquid crystal panels 4R, 4G, and 4B are projected onto a screen 6 by the projection lens 5 in an enlarged manner, and thus a projection image (display image) is generated on the screen 6.

Further, as shown in FIG. 2, the image display device 10 includes a computer program which causes various hardware to function as a display information input unit 11, the display information processing unit 12, a unit 13 adjusting the amount of illumination light, display and driving units 14R, 14G, and 14B, in addition to the above-mentioned solid light sources 2R, 2G, and 2B and the liquid crystal panels 4R, 4G, and 4B.

The display information input unit 11 is input with display information from a PC (personal computer), a DVD (digital versatile disk) player, or the like, performs, for example, a decoding process in a case of compressed digital data and performs, for example, an A/D (analog to digital) conversion process in a case of an analog signal, and then supplies converted image signals corresponding to RGB colors to the display information processing unit 12.

The display information processing unit 12 has a function of determining the amount of light to be illuminated onto the liquid crystal light valve according to display information of a current frame and transmitting an adjustment signal according to the amount of illumination light to the unit 13 adjusting the amount of illumination light; and a function of performing a predetermined process (for example, a color conversion process or a gray-scale characteristic correction process) on the display information and transmitting image data, which has been subjected to the predetermined process, to each of the display and driving units 14R, 14G, and 14B of the liquid crystal panels 4R, 4G, and 4B corresponding to the respective colors. As shown in FIG. 3, the display information processing unit 12 includes an image analysis processing unit 121 serving as a gray-scale range change processing unit, a color conversion processing unit 122, and a color conversion information storage unit 123.

The image analysis processing unit 121 creates brightness information with respect to the brightness of a projection image on the basis of the display information and determines the amount of illumination light to be illuminated onto the liquid crystal light valve on the basis of the corresponding brightness information. In addition, the image analysis processing unit 121 outputs an adjustment signal according to the determined amount of illumination light to the color conversion processing unit 122 and the unit 13 adjusting the amount of illumination light.

Furthermore, the image analysis processing unit 121 performs a gray-scale range change process with respect to the display information according to the determined amount of illumination light and changes the gray scale (dynamic range) used in the liquid crystal light valve. In addition, the image analysis processing unit 121 outputs image data, which has been subjected to the gray-scale range change process, according to the display information to the color conversion processing unit 122.

The color conversion processing unit 122 performs a color conversion process with respect to display information outputted from the image analysis processing unit 121 on the basis of the amount of illumination light based on an adjustment signal outputted from the image analysis processing unit 121 and color conversion information, which will be described later, stored in the color conversion information storage unit 123, and performs a projection image based on the input display information within a predetermined color space (for example, a standard color space of sRGB) such that colors can be reproduced. In addition, the color conversion processing unit 122 outputs image data, which has been subjected to the color conversion process, according to the display information to the display and driving units 14R, 14G, and 14B.

The color conversion information storage unit 123 stores color conversion information for performing the color conversion process in the color conversion processing unit 122. Specifically, the color conversion information is composed of a three-dimensional look-up table (hereinafter, referred to as '3DLUT') in which each input pixel value (each RGB input value) corresponding to each color is associated with each output pixel value (each RGB output value) for making the display image color-reproduced within a predetermined color space in correspondence with each RGB input value and which converts each input pixel value (each RGB input value) for each color, which corresponds to each pixel in image data outputted from the image analysis processing unit 121, into each RGB output value. In addition, the color conversion information storage unit 123 stores a plurality of 3DLUTs, corresponding to the amount of illumination light, determined according to the brightness information therein. For example, in the case in which the image analysis processing unit 121 determines the amount of illumination light according to the brightness information in N step, the color conversion information storage unit 123 stores N 3DLUTs corresponding to the adjusted amount of illumination light.

The unit 13 adjusting the amount of illumination light controls the solid light sources 2R, 2G and 2B corresponding to the respective colors and adjusts the amount of illumination light by using a PWM (pulse width modulation) method on the basis of the adjustment signal with respect to the amount of illumination light output from the display information processing unit 12. That is, the unit 13 adjusting the amount of illumination light controls the amount of light emitted from the solid light sources 2R, 2G, and 2B.

The display and driving units 14R, 14G, and 14B generate a driving signal on the basis of image data output from the display information processing unit 12 and drive the liquid crystal panels 4R, 4G, and 4B, respectively.

Operation of Image Display Device

Next, an operation of the image display device 10 will be described with reference to the accompanying drawings.

Figure 4:
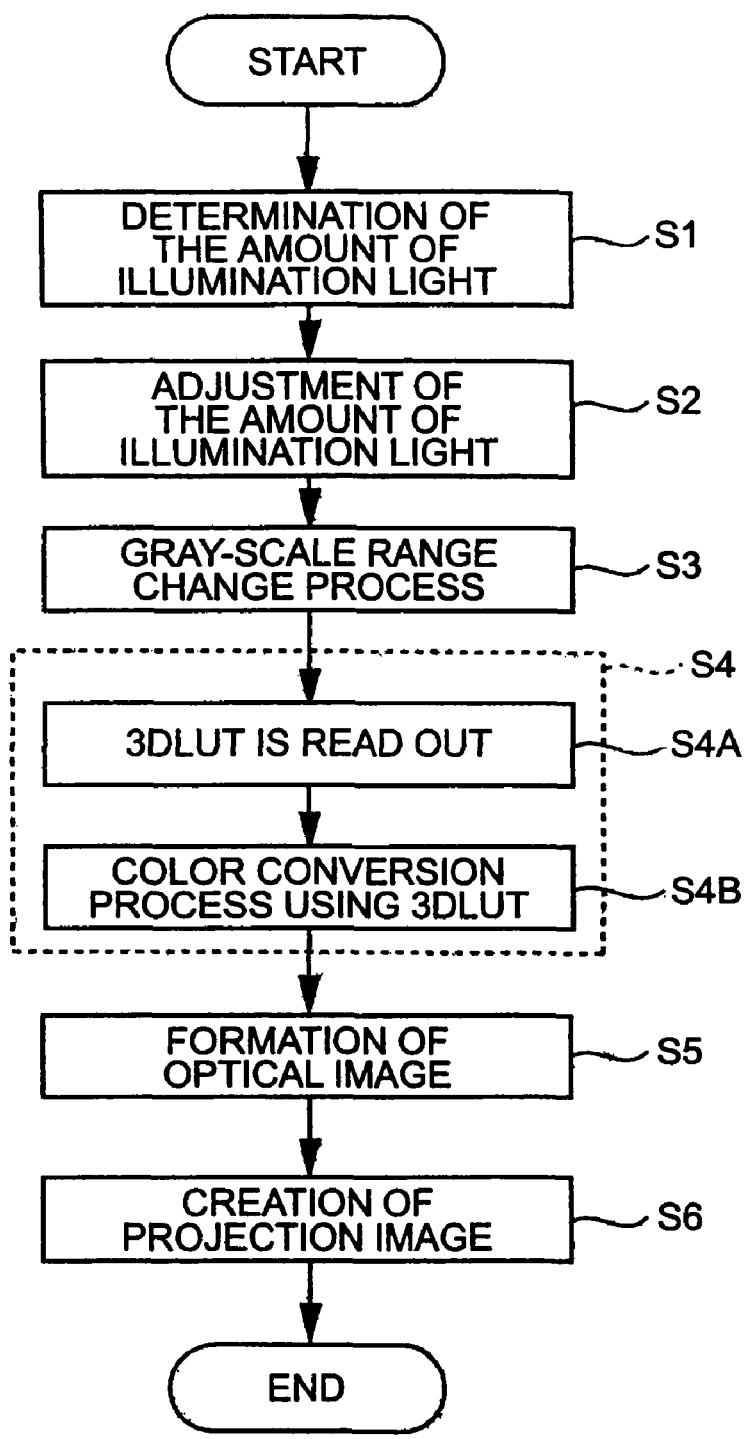
FIG. 4 is a flow chart explaining an operation of the image display device in the first embodiment.

FIG. 4 is a flow chart explaining the operation of the image display device 10.

First, the image analysis processing unit 121 included in the display information processing unit 12 analyzes display information inputted through the display information input unit 11 and determines the amount of light to be illuminated onto a liquid crystal light valve (step S1).

Figure 5:
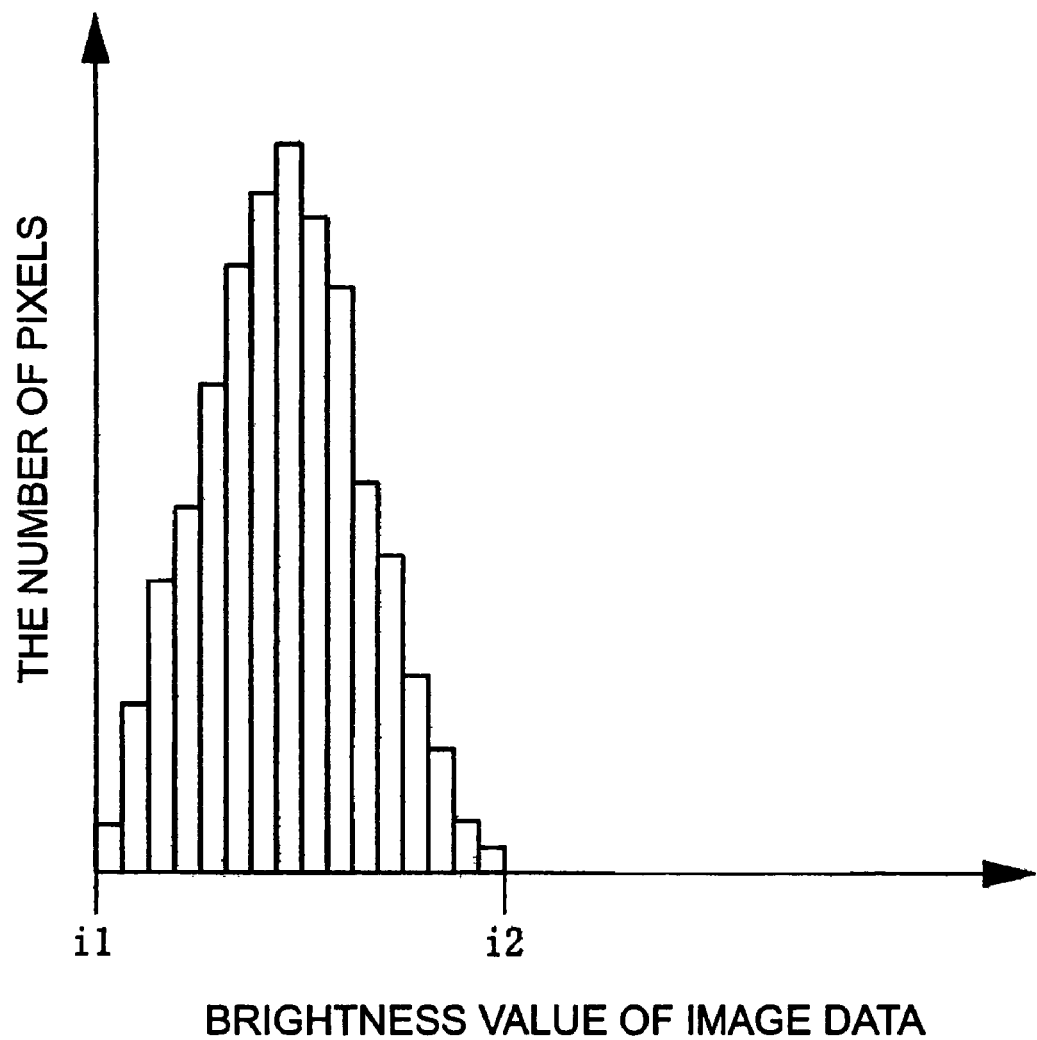
FIG. 5 is a view illustrating an example of a process in which an image analysis processing unit determines the amount of illumination light according to brightness information in the first embodiment.

FIG. 5 is a view illustrating an example of a process in which the image analysis processing unit 121 determines the amount of illumination light according to the brightness information.

For example, the image analysis processing unit 121 analyzes the input image data (display information) and creates histogram showing the number of pixels corresponding to the brightness value of the image data, as shown an example of FIG. 5. In addition, the image analysis processing unit 121 calculates the total brightness value (brightness information) with respect to the entire screen on the basis of the created histogram, reads out the amount of illumination light corresponding to the total brightness value from, for example, a memory (not shown), and determines the corresponding amount of illumination light as an amount of illumination light to be illuminated onto the liquid crystal light valve. In addition, the image analysis processing unit 121 outputs an adjustment signal according to the determined amount of illumination light to the color conversion processing unit 122 and the unit 13 adjusting the amount of illumination light.

Furthermore, other than the method of determining the amount of illumination light on the basis of the total brightness value (brightness information), which is the example shown in FIG. 5, it is possible to use a method in which, for example, a maximum value of a brightness value (RGB value) of input image data is adopted as brightness information and then the amount of illumination light is determined on the basis of the brightness information.

After step S1, the unit 13 adjusting the amount of illumination light adjusts the amount of illumination light by controlling the solid light sources 2R, 2G, and 2B corresponding to the respective colors according to the adjustment signal output from the image analysis processing unit 121 (step S2).

After step S2, the image analysis processing unit 121 performs a gray-scale range change process with respect to the input image data (display information) according to the amount of illumination light determined in step S1 (step S3). Then, the image analysis processing unit 121 outputs the image data, which has been subjected to the gray-scale range change process, to the color conversion processing unit 122.

Figure 6:
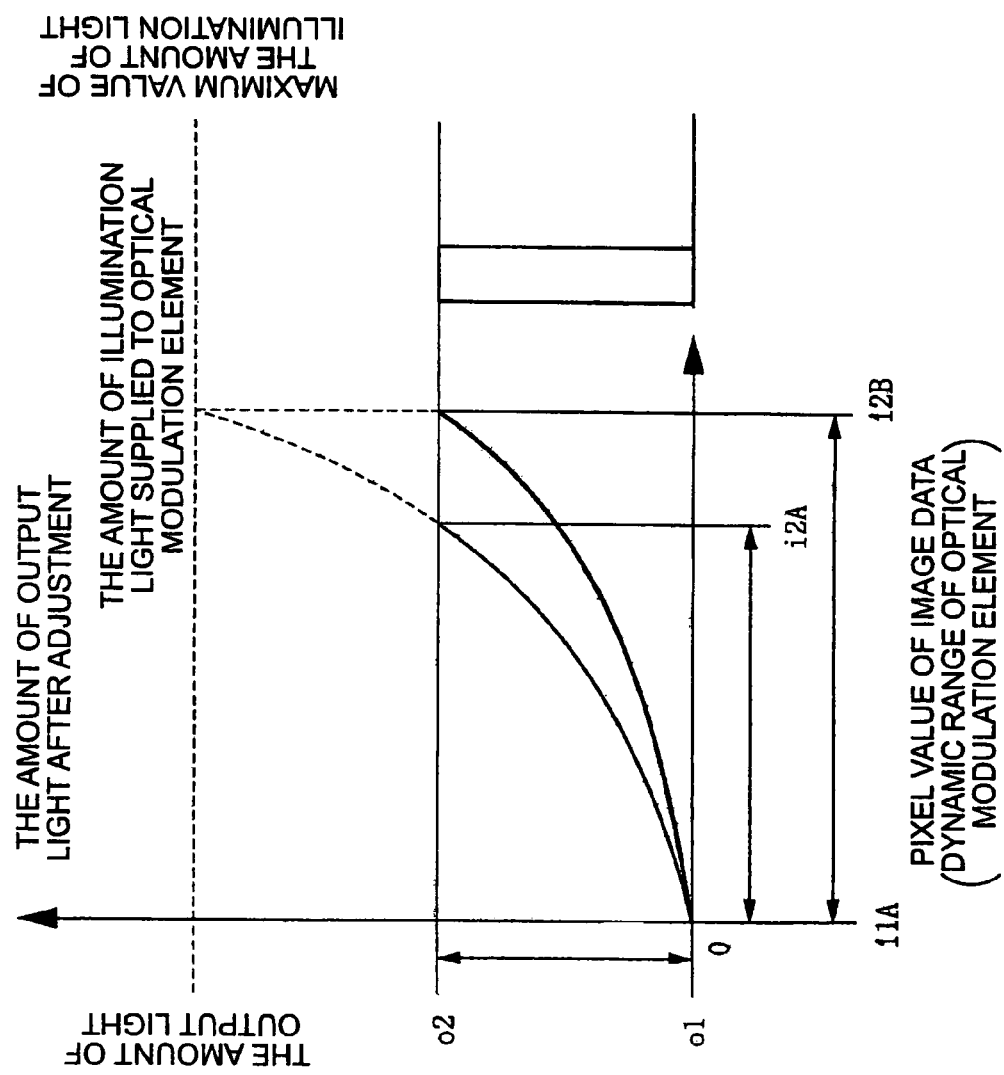
FIG. 6 is a view illustrating an example of a gray-scale change process of the image analysis processing unit in the first embodiment.

FIG. 6 is a view illustrating an example of the gray-scale range change process performed by the image analysis processing unit 121. FIG. 6 shows a gray-scale range change process when the amount of illumination light is determined according to the histogram shown in FIG. 5.

When the adjustment signal is output to the unit 13 adjusting the amount of illumination light so as to reduce the amount of illumination light output from the solid light sources 2R, 2G, and 2B, as shown in the example of FIG. 6, the image analysis processing unit 121 extends a pixel-side gray-scale range (dynamic range) i1A-i2A, which is for realizing a brightness range i1-i2 (refer to FIG. 5) based on the input image data, to a gray-scale range i1A-i2B within a range in which the maximum value of the amount of light outputted through a pixel of the liquid crystal light valve is not changed and thus a brightness range i1-i2 having many gray-scale levels is realized. The gray-scale range change process makes the gray-scale range widened, and thus a dark portion having a low brightness value can be easily viewed.

After step S3, the color conversion processing unit 122 performs a color conversion process with respect to the image data outputted from the image analysis processing unit 121 on the basis of the amount of illumination light based on the adjustment signal outputted from the image analysis processing unit 121 and the color conversion information stored in the color conversion information storage unit 123 (step S4).

Specifically, the color conversion processing unit 122 reads 3DLUT corresponding to the amount of illumination light (the amount of illumination light adjusted in step S2) based on the adjustment signal output from the image analysis processing unit 121 among the plurality of 3DLUTs stored in the color conversion information storage unit 123 (step S4A).

After step S4A, the color conversion processing unit 122 converts each RGB input value, which corresponds to each pixel in the image data input from the image analysis processing unit 121, into each RGB output value by referring to the read 3DLUT (step S4B). Then, the color conversion processing unit 122 outputs the image data, having the RGB output value converted for each pixel, to each of the display and driving units 14R, 14G, and 14B.

After step S4, the display and driving units 14R, 14G, and 14B generate driving signals corresponding to RGB colors on the basis of the image data output from the color conversion processing unit 122, and drive the liquid crystal panels 4R, 4G, and 4B so as to form an optical image on each of the liquid crystal panels 4R, 4G, and 4B (step S5).

Thereafter, the respective optical images formed on the liquid crystal panels 4R, 4G, and 4B are combined by the dichroic prism 1 to be a color image and the color image is then projected onto the screen 6 by the projection lens 5 in an enlarge manner, and thus a projection image is generated on the screen 6 (step S6).

Figure 7:
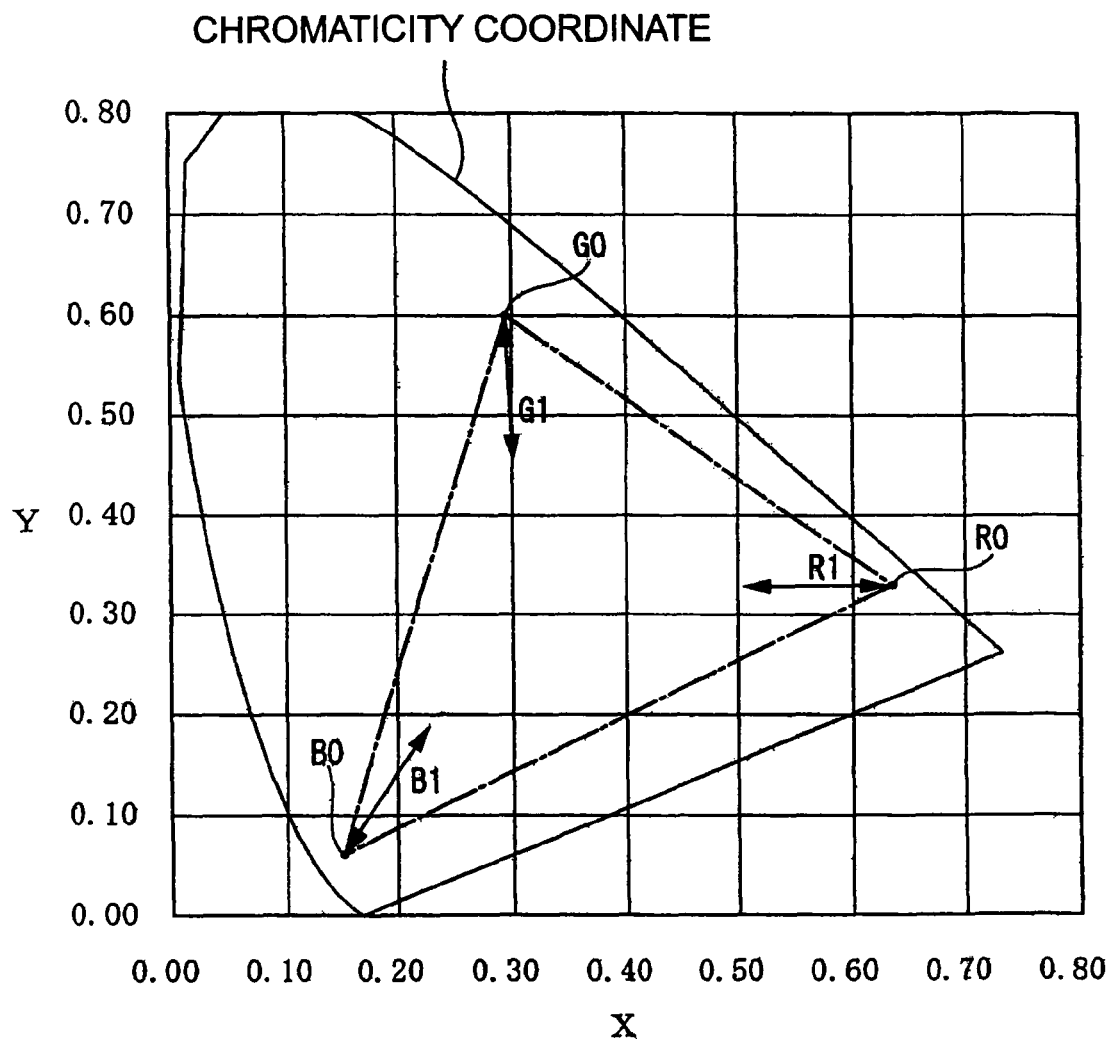
FIG. 7 is a view explaining an example of a characteristic of a liquid crystal light valve in the first embodiment.
Figure 8:
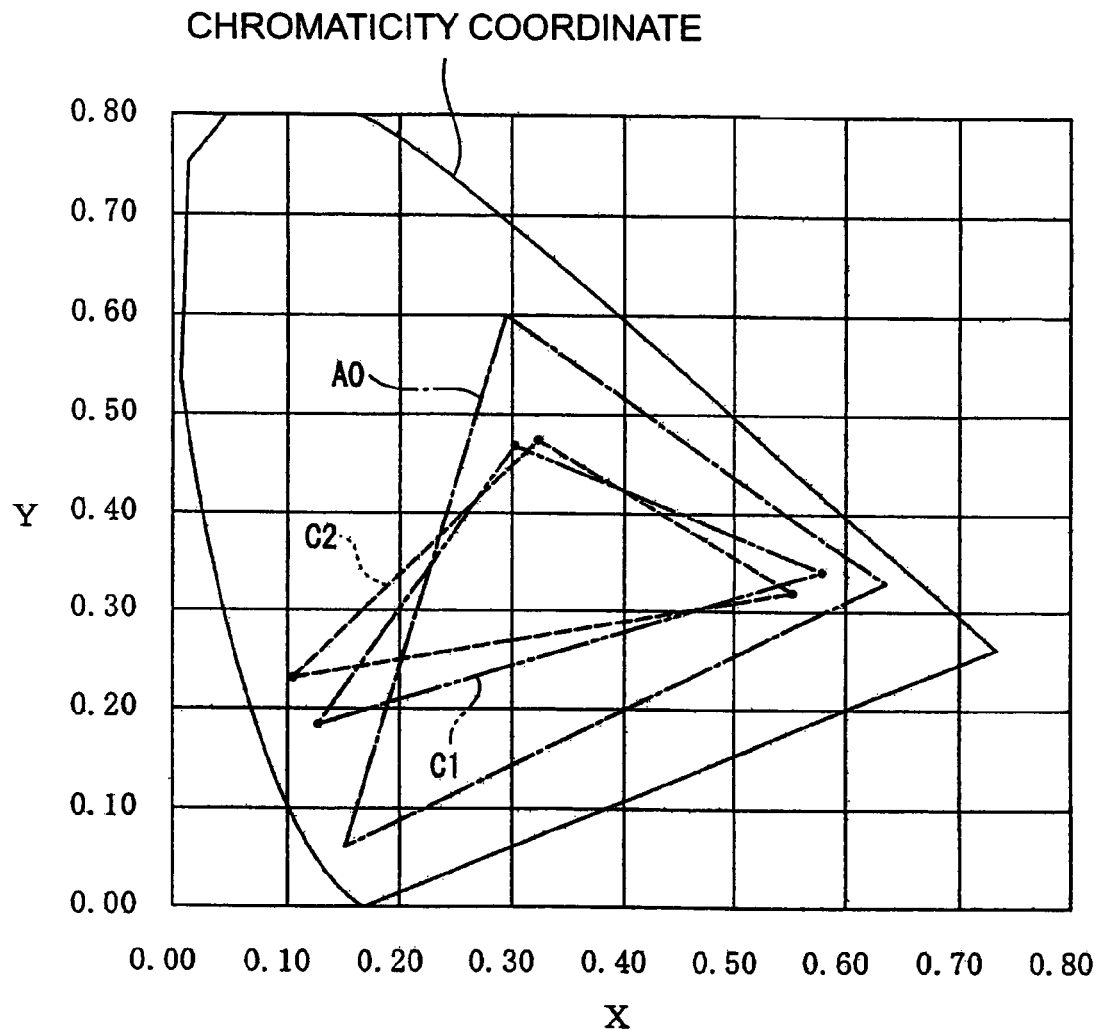
FIG. 8 is a view explaining an example of a characteristic of a liquid crystal light valve in the first embodiment.

FIGS. 7 and 8 are views explaining an example of a characteristic of a liquid crystal light valve. FIGS. 7 and 8 show xy chromaticity diagrams, respectively.

Each liquid crystal light valve formed by each of the liquid crystal panels 4R, 4G, and 4B has the following characteristic.

For example, the liquid crystal light valve has a characteristic in which some light beams leak through the liquid crystal light valve even when a black image is realized by setting each RGB output value to zero. For this reason, in the case of a dark image, for example, when an R output value is 10 and each of GB output values is zero, light leaks through the liquid crystal light valve corresponding to each of the GB colored light beams. As a result, an optical image, having the R colored light beam, formed by the liquid crystal light valve corresponding to the R colored light beam is affected by other colored light beams and thus the color saturation level becomes low. On the other hand, in the case in which the amount of illumination light is adjusted to reduce the amount of illumination light in step S2, the amount of light leaking through each of the liquid crystal light valves corresponding to each of the GB colored light beams is reduced due to the effect of the reduced amount of illumination light. As a result, the R colored light beam is not easily affected by the other colored light beams, and accordingly, the color saturation level becomes high. Specifically, referring to FIG. 7, assuming that the chromaticity coordinates corresponding to RGB which are not affected by the other colored light beams are R0, G0, and B0, respectively, since each optical image corresponding to RGB is easily affected by the other colored light beams in a state in which the amount of illumination light is not adjusted, colors corresponding to R0, G0, and B0 change toward a central side so as to reduce the saturation level. In addition, in the case in which the amount of illumination light is adjusted to reduce the amount of illumination light in step S2, since each optical image corresponding to RGB is not easily affected by the other colored light beams, the colors corresponding to R0, G0, and B0 do not change toward the central side. As a result, the chromaticity coordinates are extended outside (that is, toward R0, G0, and B0) and thus the saturation level becomes high. That is, in the case in which the amount of illumination light is adjusted, the colors corresponding to R0, G0, and B0 change in the directions indicated by arrows R1, G1, and B1, respectively, and as a result, colors of projection images become different from each other.

Further, for example, in many cases, the gray-scale characteristic of the liquid crystal light valve is not linear on the chromaticity coordinate and the color characteristic of the liquid crystal light valve at a predetermined brightness level is different from that of the liquid crystal light valve at another brightness level. That is, as shown in FIG. 8, assuming that the color characteristic of the liquid crystal light valve at a predetermined brightness level is a characteristic C1 in a state in which the amount of illumination light is not adjusted, when the gray-scale range change process is performed so as to change the gray-scale range in step S3, the color characteristic does not match the characteristic C1 because the RGB values of image data output to the display and driving units 14R, 14G, and 14B are different from those in a case in which the amount of illumination light is not adjusted. For example, the color characteristic becomes a characteristic C2 which is different from the characteristic C1.

In the related art, in order that a projection image projected onto the screen 6 can be color-reproduced in a predetermined color space A0 (for example, a standard color space of sRGB shown in FIG. 8), a color conversion process in which the color characteristic C1 of the liquid crystal light valve at a predetermined brightness level in a state in which the amount of illumination light is not adjusted is positioned within the predetermined color space A0, for example, a color conversion process in which each RGB input value is converted into each RGB output value by referring to one 3DLUT so as to make the characteristic C1 positioned within the predetermined color space A0 is performed. In the conventional color conversion process, it is possible to make a projection image, which is projected onto the screen 6 and of which the characteristic C1 is positioned within the predetermined color space A0, color-reproduced within the predetermined color space A0 under the state in which the amount of illumination light is not adjusted. However, in the conventional color conversion process, there is no counter measure against a case in which the colors corresponding to R0, G0, and B0 change toward the directions indicated by the arrows R1, G1, and B1, respectively, such that the colors changes as shown in FIG. 7 or a case in which the characteristic C1 changes to the characteristic C2 as shown in FIG. 8 due to the adjustment of the amount of illumination light performed in step S2 and the gray-scale range change process performed in step S3 described above. That is, since the projection image projected onto the screen 6 cannot be color-reproduced within the predetermined color space A0, the color of the projection image changes.

Further, the plurality of 3DLUTs stored in the color conversion information storage unit 123 is 3DLUTs corresponding to the amount of illumination light determined by the brightness information as described above. That is, the plurality of 3DLUTs stored in the color conversion information storage unit 123 is information corresponding to a case in which the colors corresponding to R0, G0, and B0 change toward the directions indicated by the arrows R1, G1, and B1, according to the amount of illumination light such that the colors changes as shown in FIG. 7 or a case in which the characteristic C1 changes to the characteristic C2 as shown in FIG. 8. That is, by converting each RGB input value of input image data into each RGB output value so as to change the amount of illumination light by referring to 3DLUT corresponding to the amount of illumination light among the plurality of 3DLUTs, even in the case in which the colors corresponding to R0, G0, and B0 change toward the directions indicated by the arrows R1, G1, and B1, such that the colors changes as shown in FIG. 7 or the case in which the characteristic C1 changes to the characteristic C2 as shown in FIG. 8, the projection image projected onto the screen 6 can be color-reproduced within the predetermined color space A0.

In addition, the 3DLUT converts each RGB input value, for example, an eight-bit value (one of the values within a range of 0 to 255), of input image data, into each RGB output value, for example, a ten-bit value (one of the values within a range of 0 to 1023), according to the gray-scale characteristic of the liquid crystal light valve. That is, in the present embodiment, the color conversion processing unit 122 performs the color conversion process by referring to 3DLUT such that a gray-scale characteristic correction (γ characteristic correction) is performed.

According to the first embodiment described above, since the color conversion processing unit 122 performs the color conversion process (step S4), which corresponds to the amount of illumination light, for image data even when the amounts of illumination light beams emitted from the red solid light source 2R, the green solid light source 2G, and the blue solid light source 2B are adjusted, respectively, it is possible to make the projection image color-reproduced within a predetermined color space A0 by adjusting the amount of illumination light so as to offset the effect with respect to the projection image, in both the cases in which the amount of illumination light is adjusted and not adjusted. Accordingly, it is possible to reliably maintain the color of the projection image even when the amount of illumination light is adjusted.

Further, since the color conversion processing unit 122 performs the color conversion process, which corresponds to the adjusted amount of illumination light, for image data, that is, since the color conversion process according to the adjustment (step S2) of the amount of illumination light and the gray-scale range change process (step S3), even when the gray-scale range is changed by the gray-scale range change process, it is possible to perform the color conversion process for the image data corresponding to each color characteristic (for example, C1 or C2) of the liquid crystal light valve, the each color characteristic becoming changed by the gray-scale range change process. Accordingly, the projection image can be color-reproduced within the predetermined color space A0. As a result, even when the amount of illumination light is adjusted and the gray-scale range is changed, the color of the projection image can be reliably maintained.

Here, the color conversion information storage unit 123 stores the plurality of 3DLUTs according to the amount of illumination light adjusted by the unit 13 adjusting the amount of illumination light, each of the plurality of 3DLUTs being provided such that each RGB value, which is a pixel value corresponding to each color, is associated with each RGB output value for making the projection image color-reproduced within the predetermined color space A0 in correspondence with each RGB value and each RGB input value for each color, which corresponds to each pixel in image data, is converted into each RGB output value. In addition, when the color conversion processing unit 122 performs the color conversion process (step S4), the color conversion processing unit 122 reads out 3DLUT (step S4A), corresponding to the amount of illumination light adjusted by the unit 13 adjusting the amount of illumination light, among the plurality of 3DLUTs, and converts each RGB input value into each RGB output value by referring to the corresponding 3DLUT. Thereby, a processing load at a time when the color conversion process is performed can be reduced as compared with a case in which, for example, a color conversion processing unit performs a color conversion process of calculating each RGB output value by an operation using a predetermined color conversion function, and as a result, the color conversion process can be performed quickly.

Furthermore, since the color conversion processing unit 122 performs the color conversion process by referring to 3DLUT such that the gray-scale characteristic correction (γ characteristic correction) of the liquid crystal light valve can also be performed, it is not necessary to prepare a separate processing unit that performs the gray-scale characteristic correction. As a result, the circuit configuration of the display information processing unit 12 can be simplified, and accordingly, the power can be saved and a low manufacturing cost can be saved.

Second Embodiment

Next, a second embodiment of the invention will be described with reference to the accompanying drawings.

Figure 9:
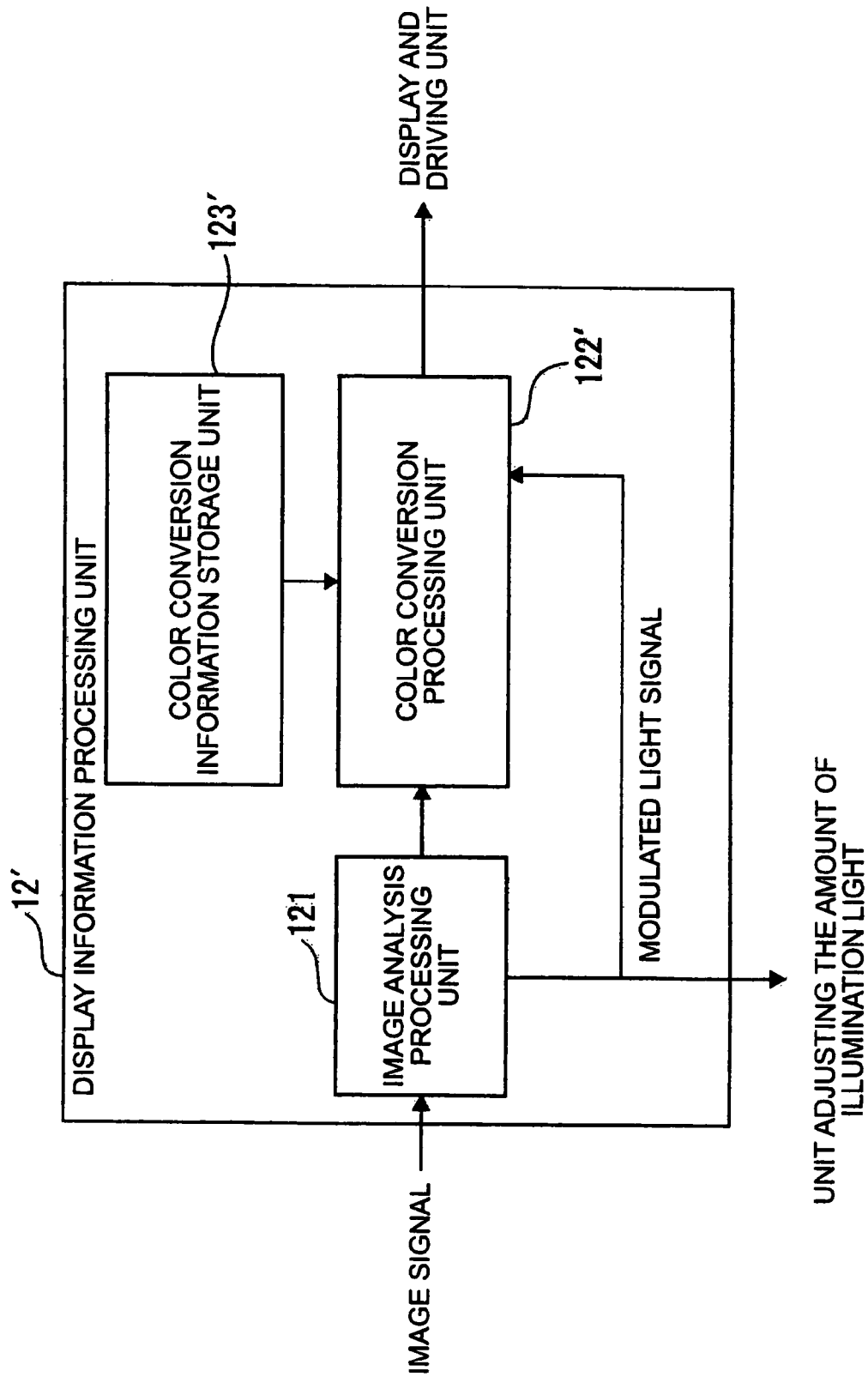
FIG. 9 is a block diagram illustrating the structure of a display information processing unit in a second embodiment.

FIG. 9 is a block diagram illustrating the configuration of a display information processing unit 12' in the second embodiment.

The color conversion information storage unit 123 in the first embodiment stores the plurality of 3DLUTs corresponding to the number of processes of changing the amount of illumination light determined by the brightness information. In addition, the color conversion processing unit 122 performs the color conversion process by referring to 3DLUT, which corresponds to the amount of illumination light determined by the image analysis processing unit 121, among the plurality of 3DLUTs.

On the other hand, in the second embodiment, a color conversion processing unit 122' performs a color conversion process of calculating each RGB output value of image data by an operation using a predetermined color conversion function on the basis of each RGB input value and the amount of illumination light of inputted image data. The configuration of the second configuration is the same as that of the first embodiment except that the color conversion processing unit 122' and a color conversion information storage unit 123'.

The color conversion processing unit 122' calculates RGB output values (Rout, Gout, Bout) for each color, which correspond to each pixel in image data to be output to the display and driving units 14R, 14G, and 14B by using RGB input values (Rin, Gin, Bin) for each color, which correspond to each pixel in image data output from the image analysis processing unit 121 and the amount α of illumination light based on an adjustment signal on the basis of a color conversion function of equation 1, to be expressed below, in which each input pixel value (RGB input value (Rin, Gin, Bin)) for each color and the amount α of illumination light determined by the brightness information are used as conversion parameters. In addition, the color conversion processing unit 122' outputs the image data, which has the respective RGB output values (Rout, Gout, Bout) for each color, to the display and driving units 14R, 14G, and 14B.

$$R_{out}=f_1(R_{in},G_{in},B_{in},\alpha),$$

$$G_{out}=f_2(R_{in},G_{in},B_{in},\alpha),$$

$$B_{out}=f_3(R_{in},G_{in},B_{in},\alpha) \qquad \text{Equation 1}$$

For example, equation 1 can be replaced with color conversion functions to be expressed in equation 2 below.

$$R_{out}=a_{11}(R_{in}-b_{11})^{\gamma 11}+c_{11}+a_{12}(G_{in}-b_{12})^{\gamma 12}+c_{12}+a_{13}(B_{in}-b_{13})^{\gamma 13}+c_{13},$$

$$G_{out}=a_{21}(R_{in}-b_{21})^{\gamma 21}+c_{21}+a_{22}(G_{in}-b_{22})^{\gamma 22}+c_{22}+a_{23}(B_{in}-b_{23})^{\gamma 23}+c_{23},$$

$$B_{out}=a_{31}(R_{in}-b_{31})^{\gamma 31}+c_{31}+a_{32}(G_{in}-b_{32})^{\gamma 32}+c_{32}+a_{33}(B_{in}-b_{33})^{\gamma 33}+c_{33} \qquad \text{Equation 2}$$

Here, in equation 2, $a_{11}$, $b_{11}$, $c_{11}$, $\gamma_{11}$, $a_{21}$, $b_{21}$, $c_{21}$, $\gamma_{21}$, $a_{31}$, $b_{31}$, $c_{31}$, and $\gamma_{31}$ are adjustment coefficients determined by the amount α of illumination light and an R input value (Rin) of the image data output from the image analysis processing unit 121. In addition, the color conversion information storage unit 123' stores the adjustment coefficients as color conversion information. For example, the color conversion information has a table structure in which each of the adjustment coefficients is associated with the R input value (Rin) and the amount α of illumination light.

Further, in equation 2, $a_{12}$, $b_{12}$, $c_{12}$, $\gamma_{12}$, $a_{22}$, $b_{22}$, $c_{22}$, $\gamma_{22}$, $a_{32}$, $b_{32}$, $c_{32}$, and $\gamma_{32}$ are adjustment coefficients determined by the amount α of illumination light and a G input value (Gin) of the image data output from the image analysis processing unit 121. In addition, the color conversion information storage unit 123' stores the adjustment coefficients as color conversion information. For example, the color conversion information has a table structure in which each of the adjustment coefficients is associated with the G input value (Gin) and the amount α of illumination light.

Furthermore, in equation 2, $a_{13}$, $b_{13}$, $C_{13}$, $\gamma_{13}$, $a_{23}$, $b_{23}$, $\gamma_{23}$, $a_{33}$, $b_{33}$, $c_{33}$, and $\gamma_{33}$ are adjustment coefficients determined by the amount α of illumination light and a B input value (Bin) of the image data output from the image analysis processing unit 121. In addition, the color conversion information storage unit 123' stores the adjustment coefficients as color conversion information. For example, the color conversion information has a table structure in which each of the adjustment coefficients is associated with the B input value (Bin) and the amount α of illumination light.

Next, an operation of the image display device 10 in the second embodiment will be described with reference to the accompanying drawings.

Figure 10:
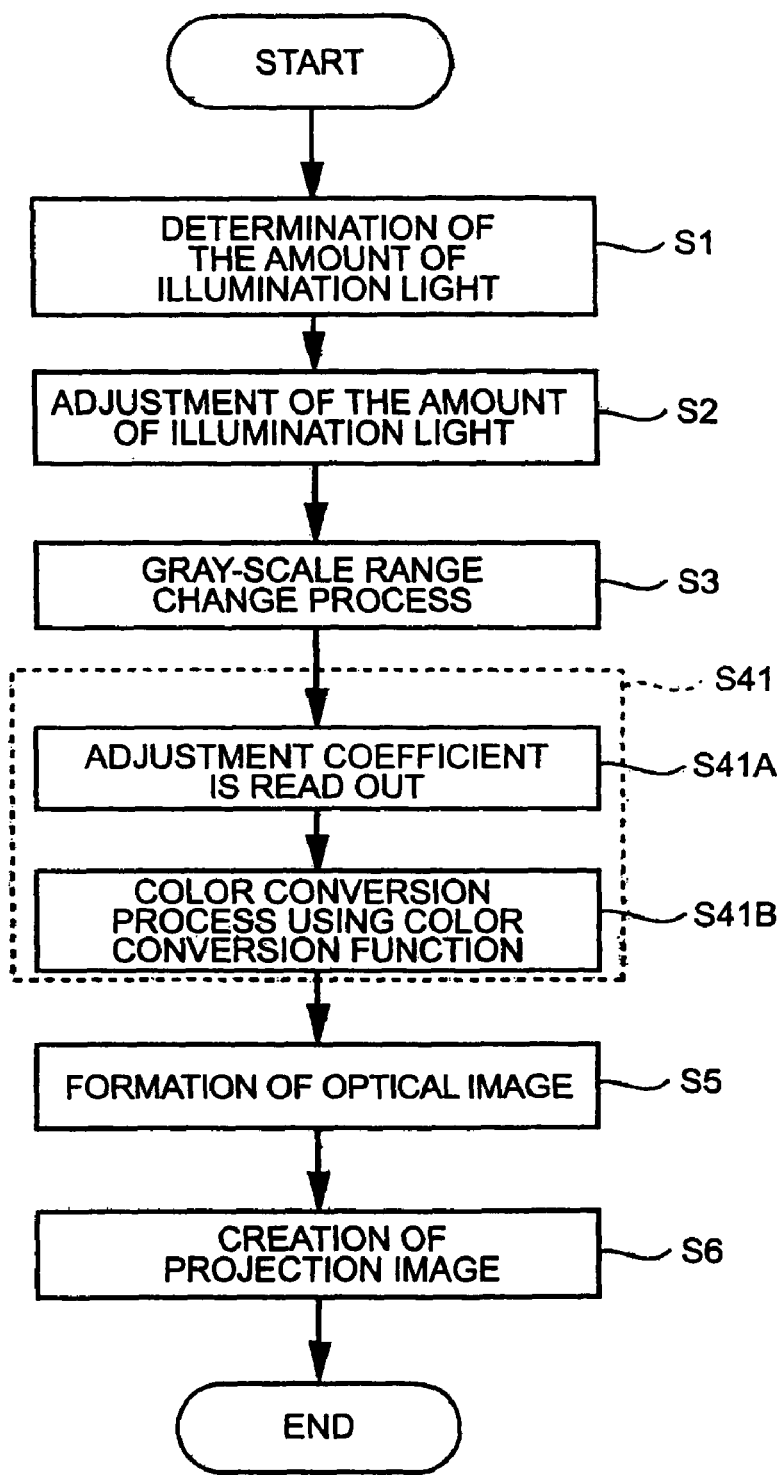
FIG. 10 is a flow chart explaining an operation of the image display device in the second embodiment.

FIG. 10 is a flow chart explaining the operation of the image display device 10 in the second embodiment.

In the second embodiment, as described above, since the configurations of the color conversion processing unit 122' and the color conversion information storage unit 123' are different from those of the first embodiment, the color conversion process (step S4) described in the first embodiment is different from that in the second embodiment. Accordingly, only a color conversion process (step S41) will be described below. Other steps S1 to S3, S5, and S6 are the same as those in the first embodiment, and thus explanation thereof will be omitted.

In step S41, the color conversion processing unit 122' performs a color conversion process for the corresponding image data by using the color conversion functions of equations 1 and 2 described above on the basis of an adjustment signal and image data output from the image analysis processing unit 121.

Specifically, the color conversion processing unit 122' reads out the amount α of illumination light based on the adjustment signal output from the image analysis processing unit 121 and the adjustment coefficient corresponding to each RGB input value (Rin, Gin, Bin) of the image data from the color conversion information storage unit 123' (step S41A).

After step S41A, the color conversion processing unit 122' calculates each RGB output value (Rout, Gout, Bout) by using the color conversion function of equation 2 on the basis of each adjustment coefficient and each RGB input value (Rin, Gin, Bin) of the image data output from the image analysis processing unit 121 which have been read out in step S41A (step S41B). In addition, the color conversion processing unit 122' outputs image data, which has the respective RGB output values (Rout, Gout, Bout) calculated for each pixel, to the display and driving units 14R, 14G, and 14B.

Furthermore, the color conversion function of equations 1 and 2 converts each RGB input value (Rin, Gin, Bin) of the inputted image data, for example, an eight-bit value into each RGB output values (Rout, Gout, Bout), for example, a ten-bit value according to a gray-scale characteristic of the liquid crystal light valve. That is, even in the present embodiment, the color conversion processing unit 122' performs the color conversion process on the basis of equations 1 and 2 described above so that the gray-scale characteristic correction (γ characteristic correction) of the liquid crystal light valve can also be performed, in the same manner as in the first embodiment.

The second embodiment has the follow effects other than approximately the same effects as in the first embodiment.

The color conversion processing unit 122' of the second embodiment calculates each RGB output value for making a projection image color-reproduced within a predetermined color space A0 by using each RGB input value for each color, which correspond to each pixel in image data and the amount α of illumination light adjusted by the unit 13 adjusting the amount of illumination light on the basis of the color conversion function in which each pixel value (RGB input value) for each color and the amount α of illumination light are used as conversion parameters. Thus, as compared with the configuration of the first embodiment in which the color conversion processing unit 122 converts each RGB input value into each RGB output value by referring to the corresponding 3DLUT, it is possible to reduce the amount of information required for the color conversion process (step S41). Accordingly, since the color conversion information storage unit 123' can be constructed with a small storage capacity, the image display device 10 can be manufactured with a low cost.

Third Embodiment

Next, a third embodiment of the invention will be described with reference to the accompanying drawings.

Figure 11:
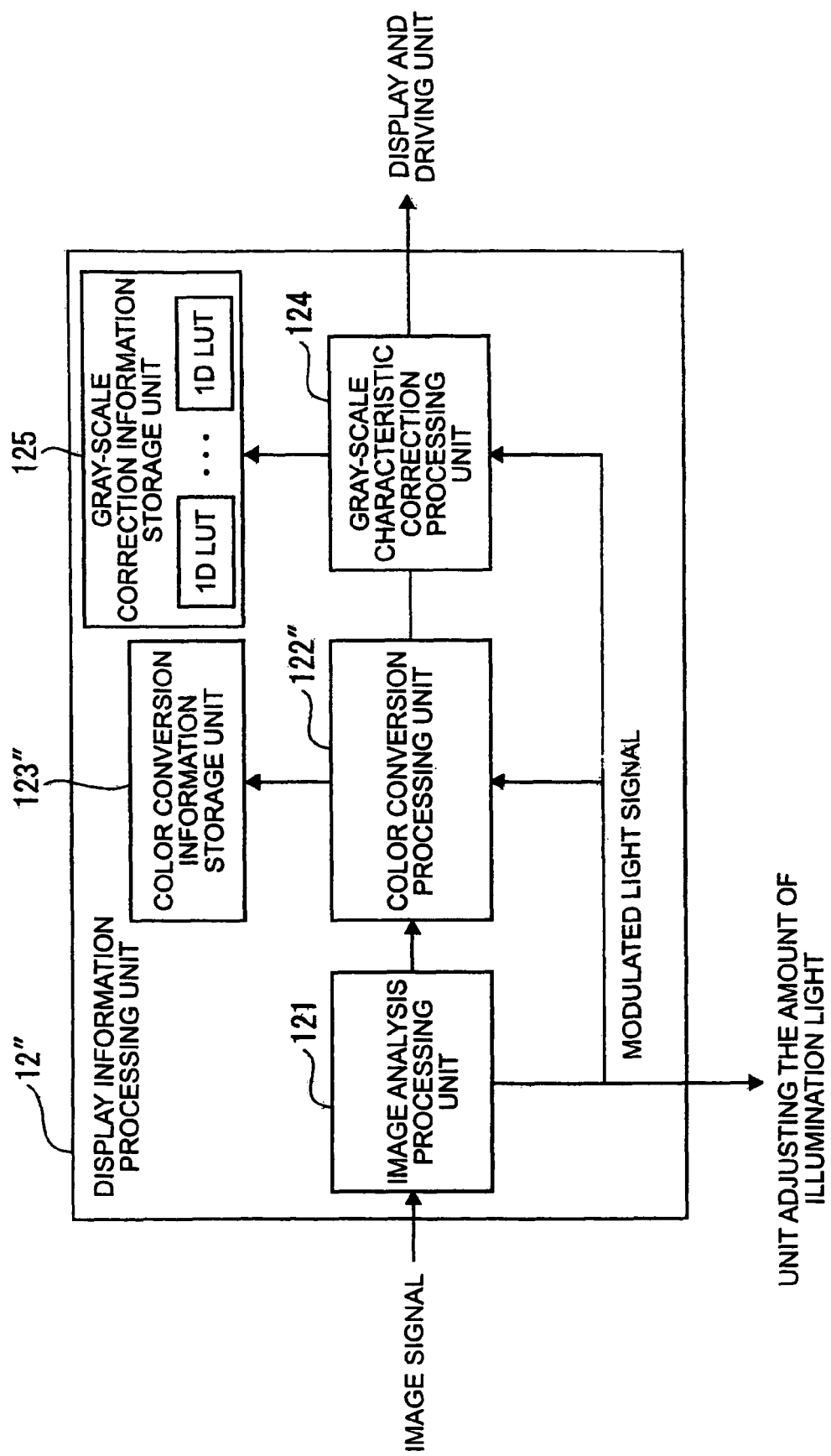
FIG. 11 is a block diagram illustrating the structure of a display information processing unit in a third embodiment.

FIG. 11 is a block diagram illustrating the structure of a display information processing unit 12" in the third embodiment.

The color conversion information storage unit 123 stores the plurality of 3DLUTs corresponding to the number of processes of changing the amount of illumination light determined by the brightness information. In addition, the color conversion processing unit 122 performs the color conversion process by referring to 3DLUT, which corresponds to the amount of illumination light determined by the image analysis processing unit 121, among the plurality of 3DLUTs. In addition, the gray-scale characteristic correction of the liquid crystal light valve is performed at the same time by the color conversion process of the color conversion processing unit 122.

On the other hand, in the third embodiment, a color conversion processing unit 122" performs a color conversion process by performing a matrix operation using a predetermined color conversion function on the basis of each RGB input value of the input image data and the amount of illumination light determined by the brightness information. In addition, the display information processing unit 12" includes a gray-scale characteristic correction processing unit 124 and a gray-scale correction information storage unit 125, and performs a gray-scale characteristic correction process separately from the color conversion process of the color conversion processing unit 122". The configuration of the third embodiment is the same as that of the first embodiment except for the color conversion processing unit 122", the color conversion information storage unit 123", the gray-scale characteristic correction processing unit 124, and the gray-scale correction information storage unit 125.

The color conversion processing unit 122" calculates each output pixel value (each RGB intermediate output value (R'out, G'out, B'out)) on the basis of a matrix operation (matrix operation of 3×3) using a color conversion function of equation 3 in which each RGB input values (Rin, Gin, Bin) for each color, which correspond to each pixel in image data output from the image analysis processing unit 121 is associated with the amount α of illumination light. In addition, the color conversion processing unit 122" outputs the image data, which has the respective RGB intermediate output values (R'out, G'out, B'out) calculated for each pixel, to the gray-scale characteristic correction processing unit 124.

$$\begin{bmatrix} R'_{out} \\ G'_{out} \\ B'_{out} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_{in} \\ G_{in} \\ B_{in} \end{bmatrix}$$ Equation 3

Here, in equation 3, $a_{11}$, $a_{21}$, and $a_{31}$ are adjustment coefficients determined by the amount α of illumination light and an R input value (Rin) of the image data output from the image analysis processing unit 121. In addition, the color conversion information storage unit 123" stores the adjustment coefficients as color conversion information. For example, the color conversion information has a table structure in which each of the adjustment coefficients is associated with the R input value (Rin) and the amount α of illumination light.

Further, in equation 3, $a_{12}$, $a_{22}$, and $a_{32}$ are adjustment coefficients determined by the amount α of illumination light and a G input value (Gin) of the image data output from the image analysis processing unit 121. In addition, the color conversion information storage unit 123" stores the adjustment coefficients as color conversion information. For example, the color conversion information has a table structure in which each of the adjustment coefficients is associated with the G input value (Gin) and the amount α of illumination light.

Furthermore, in equation 3, $a_{13}$, $a_{23}$, and $a_{33}$ are adjustment coefficients determined by the amount α of illumination light and a B input value (Bin) of the image data output from the image analysis processing unit 121. In addition, the color conversion information storage unit 123" stores the adjustment coefficients as color conversion information. For example, the color conversion information has a table structure in which each of the adjustment coefficients is associated with the B input value (Bin) and the amount α of illumination light.

The gray-scale characteristic correction processing unit 124 performs a gray-scale characteristic correction process with respect to the image data output from the color conversion processing unit 122" on the basis of the amount of illumination light based on an adjustment signal output from the image analysis processing unit 121 and gray-scale correction information, which will be described later, stored in the gray-scale characteristic correction processing unit 124.

The gray-scale correction information storage unit 125 stores the gray-scale correction information for performing the gray-scale characteristic correction process in the gray-scale characteristic correction processing unit 124. Specifically, the gray-scale correction information is composed of a one-dimensional look-up table (hereinafter, referred to as '1DLUT') by which each RGB intermediate value (R'out, G'out, B'out), which corresponds to each pixel in the image data output from the color conversion processing unit 122", is converted into each RGB output value (Rout, Gout, Bout) according to the gray-scale characteristic of the liquid crystal light valve. In addition, the gray-scale characteristic correction processing unit 124 stores a plurality of 1DLUTs corresponding to the amount of illumination light. For example, in the case in which the image analysis processing unit 121 determines the amount of illumination light according to the brightness information in N step, the gray-scale correction information storage unit 125 stores 3N 1DLUTs corresponding to the adjusted amount of illumination light and each liquid crystal light valve having one of the RGB colors.

Next, an operation of the image display device 10 in the third embodiment will be described with reference to the accompanying drawings.

Figure 12:
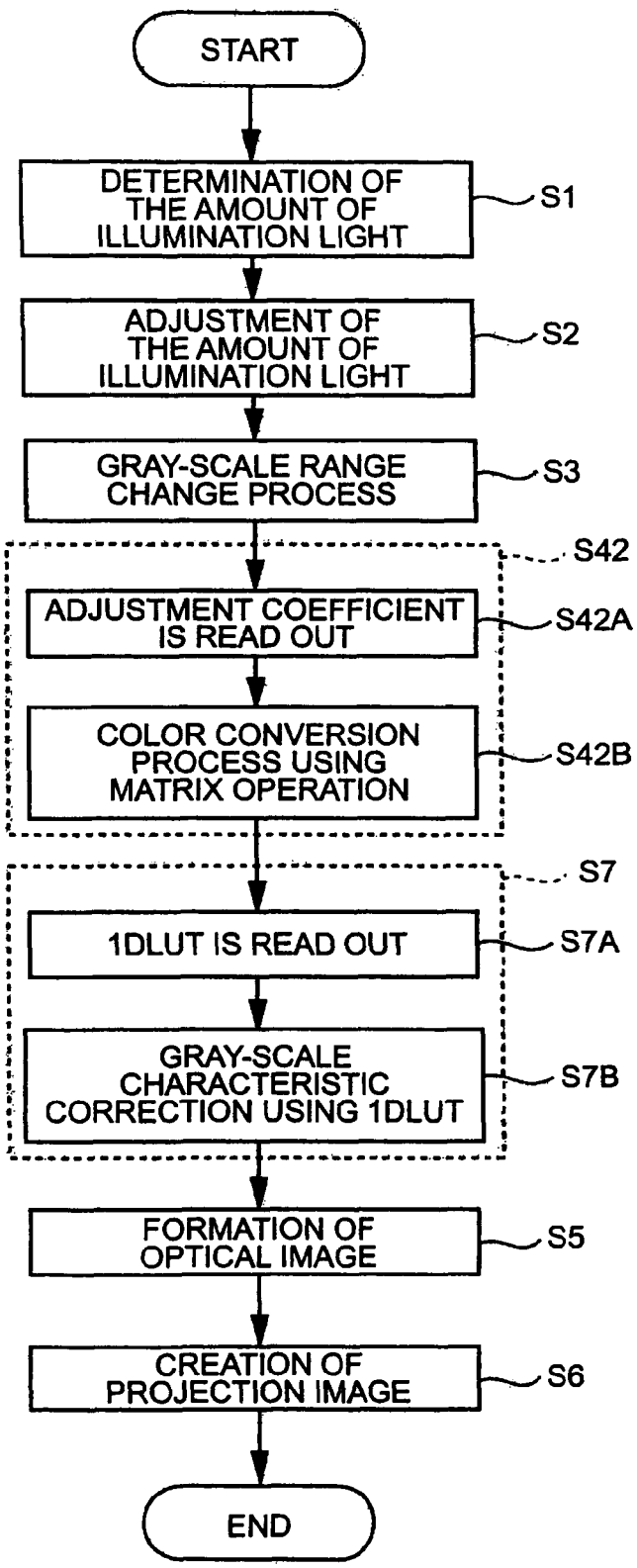
FIG. 12 is a flow chart explaining an operation of the image display device in the third embodiment.

FIG. 12 is a flow chart explaining the operation of the image display device 10 in the third embodiment.

In the third embodiment, as described above, since the configurations of the color conversion processing unit 122" and the color conversion information storage unit 123" are different from those of the first embodiment, that is, the display information processing unit 12" is provided with the gray-scale characteristic correction processing unit 124 and the gray-scale correction information storage unit 125, a color conversion process (step S42) is performed instead of the color conversion process (step S4) described in the first embodiment and a gray-scale characteristic correction process (step S7) is performed after the color conversion process (step S42). Other steps S1 to S3, S5, and S6 are the same as those in the first embodiment, and thus explanation thereof will be omitted.

In step S42, the color conversion processing unit 122" performs a color conversion process for the corresponding image data by using equation 3 described above on the basis of an adjustment signal and image data output from the image analysis processing unit 121.

Specifically, the color conversion processing unit 122" reads out the amount α of illumination light based on the adjustment signal output from the image analysis processing unit 121 and the adjustment coefficient corresponding to each RGB input value (Rin, Gin, Bin) of the image data from the color conversion information storage unit 123" (step S42A).

After step S42A, the color conversion processing unit 122" performs a matrix operation with respect to each RGB input value (Rin, Gin, Bin) of the image data output from the image analysis processing unit 121 by using equation 3 using each adjustment coefficient read in step S42A and thus calculates each RGB intermediate value (R'out, G'out, B'out) (step S42B). Then, the color conversion processing unit 122" outputs image data, which has the respective RGB intermediate values (R'out, G'out, B'out) calculated for each pixel, to the gray-scale characteristic correction processing unit 124.

After step S42, in step S7, the gray-scale characteristic correction processing unit 124 performs a gray-scale characteristic correction process for the image data on the basis of the adjustment signal output from the image analysis processing unit 121, the image data output from the color conversion processing unit 122", and 1DLUT stored in the gray-scale correction information storage unit 125.

Specifically, the gray-scale characteristic correction processing unit 124 reads out, for each of the RGB colors, 1DLUT, which corresponds to the amount of illumination light based on the adjustment signal output from the image analysis processing unit 121, among the plurality of 1DLUTs stored in the gray-scale correction information storage unit 125 (step S7A).

After step S7A, the gray-scale characteristic correction processing unit 124 converts each RGB intermediate value (R'out, G'out, B'out) of the image data input from the color conversion processing unit 122" into each RGB output value (Rout, Gout, Bout) (step S7B) by referring to each of the read 1DLUTs. In addition, the gray-scale characteristic correction processing unit 124 outputs the image data, which has the respective RGB output values (Rout, Gout, Bout) converted for each pixel, to the display and driving units 14R, 14G, and 14B.

Further, in the matrix operation using equation 3 described above in step S42, each RGB input value (Rin, Gin, Bin) of the inputted image data, for example, an eight-bit value is converted into each eight-bit RGB intermediate value (R'out, G'out, B'out). In addition, by 1DLUT in step S7, each eight-bit RGB intermediate value (R'out, G'out, B'out) is converted into, for example, each ten-bit RGB output value (Rout, Gout, Bout) according to the gray-scale characteristic of the liquid crystal light valve.

The third embodiment has the follow effects other than approximately the same effects as in the first and second embodiments.

Specifically, since the color conversion processing unit 122" performs the color conversion process of converting each RGB input value into each RGB output value in the matrix operation using a color conversion function (step S42), it is possible to simplify the circuit configuration of the color conversion processing unit 122". As a result, the power consumed in the image display device 10 can be saved and a manufacturing cost of the image display device 10 can be lowered.

Further, since the gray-scale characteristic correction processing unit 124 performs the gray-scale characteristic correction process for the image data according to the amount of illumination light adjusted by the unit 13 adjusting the amount of illumination light (step S7), it is possible to reliably maintain the color of a projection image even when the amount of illumination light is adjusted.

Furthermore, since the gray-scale characteristic correction processing unit 124 is provided separately from the color conversion processing unit 122", the gray-scale characteristic correction processing unit 124 has a function of performing the gray-scale characteristic correction process according to gray-scale characteristics of various liquid crystal light valves as compared with the configuration in which the color conversion process and the gray-scale characteristic correction process are performed at the same time by each of the color conversion processing units 122 and 122' described in the first and second embodiments. As a result, the gray-scale characteristic correction process can be reliably performed according to the gray-scale characteristics of a liquid crystal light valve.

Here, the gray-scale characteristic correction processing unit 124 reads out, for each of the RGB colors, 1DLUT, which corresponds to the amount of illumination light adjusted by the unit 13 adjusting the amount of illumination light, among the plurality of 1DLUTs stored in the gray-scale correction information storage unit 125 (step S42A), and converts each RGB intermediate value into each RGB output value by referring to each 1DLUT. Thereby, since a processing load at a time when the gray-scale characteristic correction process is performed can be reduced as compared to a case in which, for example, the gray-scale characteristic correction processing unit 124 performs the gray-scale characteristic correction process of calculating each RGB output value by an operation using a predetermined function, the gray-scale characteristic correction process can be performed quickly.

In addition, the invention is not limited to the above-mentioned embodiments, but various modifications and changes can be made within the scope and spirit of the invention.

In the embodiments, even though the unit 13 adjusting the amount of illumination light by controlling the solid light sources 2R, 2G, and 2B corresponding to the respective colors has been used as a unit adjusting the amount of illumination light, the invention is not limited thereto. For example, the following configuration may be adopted.

Figure 13:
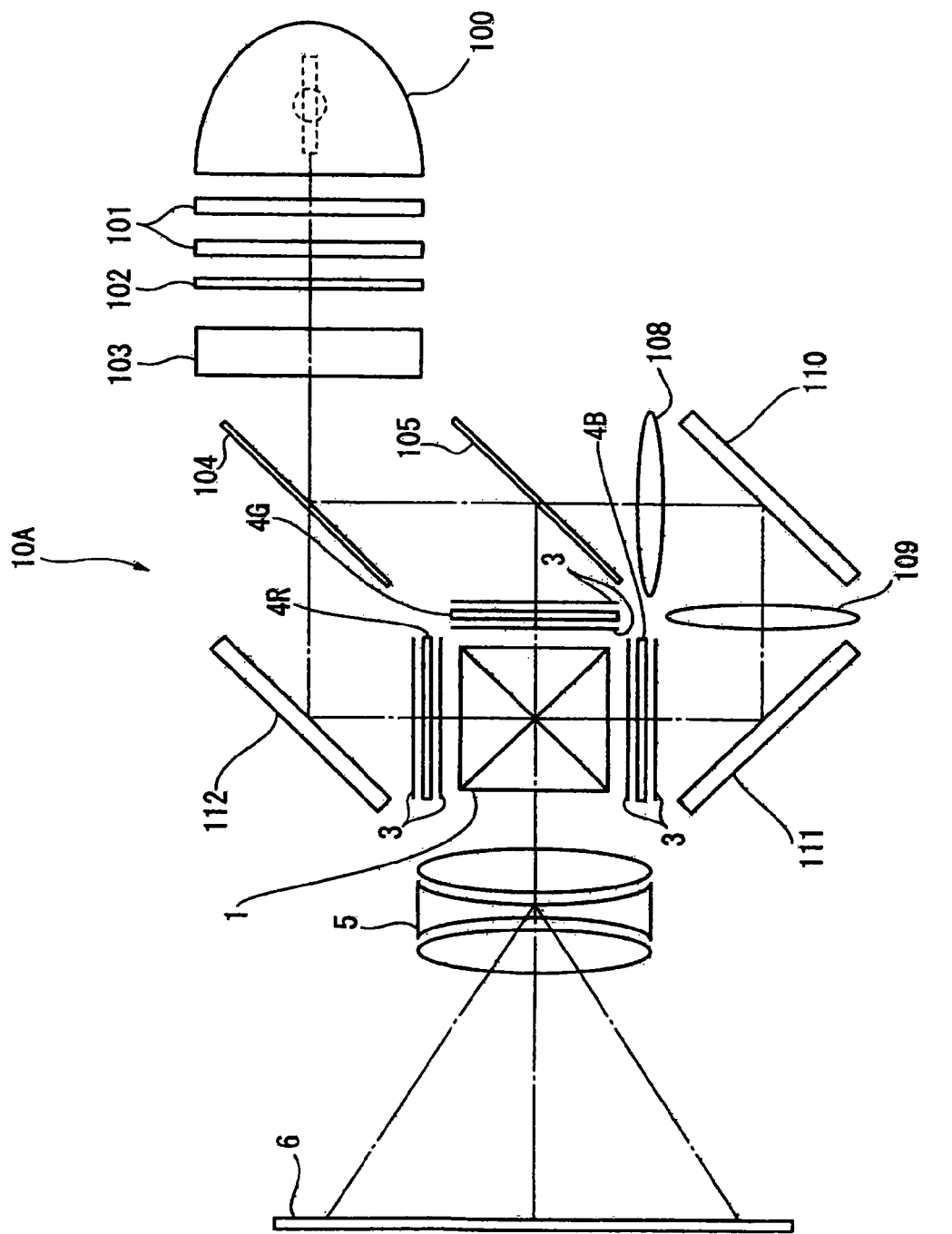
FIG. 13 is a view illustrating a modification of each of the embodiments.
Figure 14:
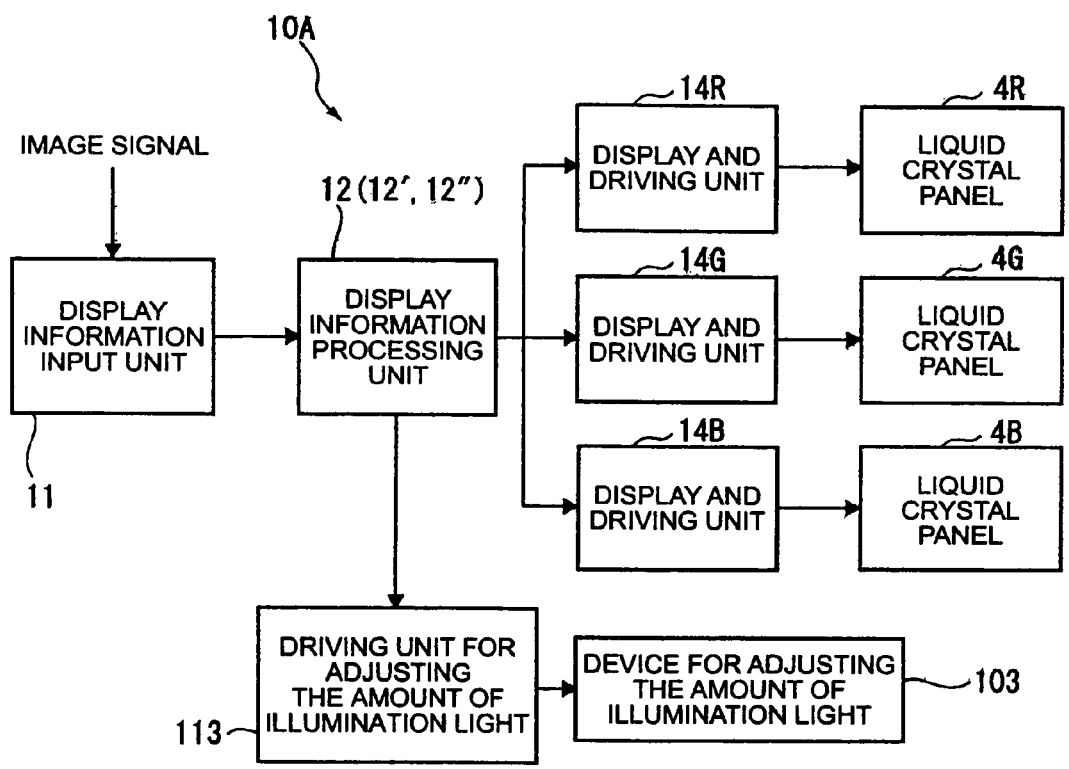
FIG. 14 is a view illustrating a modification of each of the embodiments.

FIGS. 13 and 14 are views illustrating modifications of the respective embodiments. Specifically, FIG. 13 is a plan view illustrating an optical system when the amount of light is controlled by using a device 103 for adjusting the amount of illumination light. FIG. 14 is a block diagram illustrating the structure of an image display device 10A when the device 103 for adjusting the amount of illumination light is used.

As shown in FIG. 13, the optical system when the device 103 for adjusting the amount of illumination light is used includes a light source 100 composed of a gas-emitting light source, such as a metal halide lamp, a halogen lamp, or a high-pressure mercury lamp, an integrator lens 101, a polarizing conversion element 102, a device 103 for adjusting the amount of illumination light, dichroic mirrors 104 and 105, a polarizer 3, liquid crystal panels 4R, 4G, and 4B, condensing lenses 108 and 109, reflectors 110, 111, and 112, a dichroic prism 1, and a projection lens 5.

Light emitted from the light source 100 is transmitted through the optical system, which includes the integrator lens 101, the polarizing conversion element 102, and the device 103 for adjusting the amount of illumination light, and is then incident on a color-separation optical system, which includes a dichroic mirror 104 for transmitting red light, a dichroic mirror 105 for transmitting green light, and the reflector 112, to be divided into primary light beams having red, green, and blue colors, respectively. The blue primary light beam is incident on a relay optical system including a first condensing lens 108, a second condensing lens 109, and the two reflectors 110 and 111. The red and green primary light beams, which have been transmitted through the color-separation optical system, and the blue primary color, which has been transmitted through the relay optical system, are transmitted through the polarizer 3 and are then incident on the liquid crystal panels 4R, 4G, and 4B. The optical path from the light source 100 to the liquid crystal panel 4B is longer than the other optical paths from the light source 100 to the liquid crystal panels 4R and 4G, however, since the two condensing lenses 108 and 109 converge diverging light beams, the light beams can be efficiently transmitted to the blue liquid crystal panel 4B even though the optical path is long.

In addition, as shown in FIG. 14, the image display device 10A includes a driving unit 113 for adjusting the amount of illumination light so as to drive the device 103 for adjusting the amount of illumination light.

The device 103 for adjusting the amount of illumination light is composed of a light restriction mechanism or is made of electrochromic glass, and is disposed at the light emission side of the light source 100.

The driving unit 113 for adjusting the amount of illumination light controls the device 103 for adjusting the amount of illumination light so as to adjust the amount of illumination light on the basis of an adjustment signal of the amount of illumination light supplied from the display information processing unit 12 (12', 12").

That is, the device 103 for adjusting the amount of illumination light and the driving unit 113 for adjusting the amount of illumination light correspond to a unit for adjusting the amount of illumination light.

Further, in the image display device 10A, the driving unit 113 for adjusting the amount of illumination light controls the device 103 for adjusting the amount of illumination light so as to adjust the amount of light emitted from the light source 100 on the basis of the adjustment signal supplied from the display information processing unit 12 (12', 12") in the process (step S4, S41, and S42) of adjusting the amount of illumination light described in each of the embodiments. That is, the amount of illumination light emitted from the light source 100 is constant, and the light is shielded by the device 103 for adjusting the amount of illumination light so as to adjust the amount of illumination light supplied to the liquid crystal light valve.

In the configuration described above, since the amount of light emitted from the light source 100 is constant and the amount of illumination light is adjusted by the device 103 for adjusting the amount of illumination light, it is possible to effectively adjust the light source 100 in which it is difficult to change the amount of light quickly.

In the embodiments described above, the image analysis processing unit 121 analyzes image data so as to create brightness information of the image data and determines the amount of illumination light according to the created brightness information; however, the invention is not limited thereto. For example, a configuration may be adopted in which brightness information, which is determined beforehand so as to correspond to a predetermined display image, is input from the outside through, for example, the display information input unit 11 and the amount of illumination light is determined according to the corresponding brightness information. Alternatively, a configuration may be adopted in which modulated light information related to the predetermined amount of illumination light, which is determined beforehand so as to correspond to a predetermined display image, is input from the outside through, for example, the display information input unit 11 and an adjustment signal according to the corresponding modulated light information is output to the unit 13 adjusting the amount of illumination light, the color conversion processing units 122, 122', and 122", the gray-scale characteristic correction processing unit 124, or the like.

In the embodiments and the modification, the unit 13 adjusting the amount of illumination light and the driving unit 113 for adjusting the amount of illumination light adjust the amount of illumination light according to the adjustment signal supplied from the display information processing unit 12 (12', 12"); however, the invention is not limited thereto. For example, a configuration may be adopted in which the amount of illumination light is gently adjusted with a predetermined time constant. In the configuration, it is possible to prevent a projection image from blinking due to steep change of the amount of illumination light.

In the embodiments and the modification shown in FIGS. 13 and 14, the image analysis processing unit 121 analyzes image data so as to create the brightness information and determines the amount of illumination light according to the created brightness information, and the unit 13 adjusting the amount of illumination light or the driving unit 113 for adjusting the amount of illumination light controls the solid light sources 2R, 2G, and 2B or the device 103 for adjusting the amount of illumination light so as to adjust the amount of illumination light; however, the invention is not limited thereto. For example, the invention may be applied to a configuration in which the amount of illumination light is not adjusted.

For example, the image analysis processing unit 121 analyzes the image data so as to create the brightness information and determines the gray-scale range according to the created brightness information. Then, a gray-scale range change process (a so-called black and white extension process), in which each pixel value corresponding to each pixel of the image data is increased according to the gray-scale range determined by the image analysis processing unit 121, is performed so as to change the gray-scale range. In addition, each of the color conversion processing units 122, 122', and 122" performs the color conversion process for the image data according to the gray-scale range determined by the image analysis processing unit 121.

Even in the case in which the amount of illumination light is not adjusted, as described above, the color characteristic of each liquid crystal light valve is changed due to the gray-scale range change process (a so-called black and white extension process), which changes the color of the projection image. In the configuration described above, since each of the color conversion processing units 122, 122', and 122" performs a color conversion process, which corresponds to the color characteristic (for example, C1, C2 (FIG. 8) of each liquid crystal light valve becoming different due to the gray-scale range change process, with respect to the image data, the effect with respect to the projection image caused by the gray-scale range change process is offset. As a result, it is possible to make the projection image color-reproduced within a predetermined color space (for example, a standard color space of sRGB) in both the cases in which the amount of illumination light is adjusted and not adjusted.

In the first embodiment, the color conversion information storage unit 123 stores 'n' 3DLUTs in correspondence with the number N, which is the number of processes of changing the amount of illumination light; however, the invention is not limited thereto. For example, it is possible to adopt a configuration in which a smaller number of 3DLUTs than the number N are stored beforehand in the color conversion information storage unit 123 and an insufficient part is calculated by an interpolation process.

Further, in the same manner, in the third embodiment, the gray-scale correction information storage unit 125 stores N 1DLUTs for each of the RGB colors in correspondence with the entire steps of adjusting the amount of illumination light; however, the invention is not limited thereto. For example, it is possible to adopt a configuration in which a smaller number of 1DLUTs than the number N are stored beforehand in the color conversion information storage unit 123 for each of the RGB colors and an insufficient part is calculated by an interpolation process.

Furthermore, the invention is not limited to the configuration in which the gray-scale characteristic correction process is performed by referring to 1DLUT, but may be applied to a configuration in which the gray-scale characteristic correction process is performed by changing a coefficient according to the amount of illumination light adjusted by the unit 13 adjusting the amount of illumination light so as to perform an operation using a function approximation.

In the embodiments described above, the image analysis processing unit 121 analyzes image data and determines the amount of illumination light according to the brightness information and then the unit 13 adjusting the amount of illumination light uniformly adjusts the amount of illumination light of each of the solid light sources 2R, 2G and 2B; however, the invention is not limited thereto. For example, the image analysis processing unit 121 analyzes the image data and creates the brightness information for each of the RGB colors. In addition, the image analysis processing unit 121 determines the amount of illumination light for independently adjusting the amount of illumination light of each of the solid light sources 2R, 2G, and 2B on the basis of the brightness information for each of the RGB colors created by the image analysis processing unit 121. Then, in steps S2 and S3, the process of adjusting the amount of illumination light and the gray-scale range change process are performed for each of the RGB colors according to the determined amount of illumination light.

Here, in the first embodiment, when the combination number of processes of changing the amount of illumination light corresponding to the RGB colors is $N^3$, $N^3$ or less DLUTs are stored in the color conversion information storage unit 123 in correspondence with the number $N^3$, which is the combination number of processes of changing the amount of illumination light corresponding to the RGB colors. In addition, in step S4, the color conversion processing unit 122 reads out 3DLUT corresponding to the combination of processes of changing the amount of illumination light corresponding to the RGB colors, and performs the color conversion process for the image data on the basis of the corresponding 3DLUT.

Furthermore, in the second embodiment, in step S41, the color conversion processing unit 122' calculates each RGB output value (Rout, Gout, Bout) for each color, which correspond to each pixel in image data to be output to the display and driving units 14R, 14G, and 14B by using each RGB input value (Rin, Gin, Bin) for each color, which correspond to each pixel in image data output from the image analysis processing unit 121 and each of the amounts αR, αG, and αB of illumination light based on the adjustment signal on the basis of a color conversion function of equation 4, to be expressed below, in which each input pixel value (RGB input value (Rin, Gin, Bin) for each color and each of the amounts αR, αG, and αB of illumination light determined by the brightness information are used as conversion parameters.

$$R_{out}=f_1(R_{in},G_{in},B_{in},\alpha_R),$$

$$G_{out}=f_2(R_{in},G_{in},B_{in},\alpha_G),$$

$$B_{out}=f_3(R_{in},G_{in},B_{in},\alpha_B) \quad \text{Equation 4}$$

In the first and second embodiments described above, even though the color conversion processing units 122 and 122' perform the color conversion process and the gray-scale characteristic correction process at the same time, the invention is not limited thereto. For example, in the same manner as in the third embodiment, it is possible to adopt the configuration in which a separate gray-scale characteristic correction processing unit for performing the gray-scale characteristic correction process may be prepared.

Further, in the second and third embodiments described above, even though the color conversion information storage units 123' and 123" store all of the adjustment coefficients, the invention is not limited thereto. For example, it is possible to adopt a configuration in which only an adjustment coefficient corresponding to a predetermined amount of illumination light is stored and other adjustment coefficients are calculated by an operation.

Furthermore, even though the projection type image display device has been described as an example of an image display device in the embodiments, the invention can be applied to, for example, a rear surface projection type display device or a direct view type liquid crystal display device using a backlight. In addition, the backlight used in the direct view type liquid crystal display device may be disposed, for example, at the rear side of an optical path of a liquid crystal light valve and be configured such that a plurality of long bar-shaped hot cathode fluorescent lamps (HCFL), each of which a horizontal width is longer than a vertical width thereof, is arranged in the vertical direction from the upper side of a screen and then the plurality of hot cathode fluorescent lamps is sequentially lighted so that the corresponding illuminations are scanned in the vertical direction.

Furthermore, even though the liquid crystal light valve has been described as an example of an optical modulation element in the embodiments, the invention is not limited thereto. For example, a DMD (digital micromirror device) or a reflective liquid crystal panel (LCOS: liquid crystal on silicon) may be used as the optical modulation element.

In addition, even though the best mode or the like for performing the invention has been described above, the invention is not limited thereto. In other words, while the invention has been described with reference to the exemplary embodiments thereof, it should be understood that the invention is not limited to those embodiments but various changes and modifications with respect to the shape, a material, and the number of components could be made by one skilled in the art without departing from the spirit or scope of the invention.

Therefore, the material, construction, etc. in each of the embodiments are only illustrative to make the invention easily understood and do not restrict the invention, and a name of a component excluding a part of the shape or material thereof or a name of the component excluding all of shape or material thereof is also included in the invention.

Since the image display device of the invention can reliably maintain the color of a display image even when the amount of illumination light is adjusted or the gray-scale range change process is performed, the image display device of the invention can be used as an image display device for the purpose of a presentation or a home theater.

The entire disclosure of Japanese Patent Application No. 2005-105751, filed Apr. 1, 2005 is expressly incorporated by reference herein.

What is claimed is:

1. An image display device having an optical modulation element, which modulates light emitted from a light source according to display information, and displaying a display image based on the display information, the image display device comprising:
   a unit adjusting an amount of illumination light with respect to light emitted from a light source based on brightness information on brightness of a display image based on a display information;
   a color conversion processing unit that performs a color conversion process according to the brightness information with respect to the display information so that the display image can be color-reproduced within a predetermined color space, the color conversion processing unit performs the color conversion process with respect to the display information such that the display information can also be subjected to a gray-scale characteristic correction process corresponding to a gray-scale characteristic of an optical modulation element;
   a gray-scale range change processing unit that performs a gray-scale range change process of changing a gray-scale range of the display information by increasing each pixel value, corresponding to each pixel, included in the display information based on the brightness information, and
   a display and driving unit that drives the optical modulation element based on the display information having been subjected to the gray-scale range change process and the color conversion process to display the display image.

2. An image display device having an optical modulation element, which modulates light emitted from a light source according to display information, and displaying a display image based on the display information, the image display device comprising:
   a unit adjusting an amount of illumination light with respect to light emitted from a light source based on brightness information on brightness of a display image based on a display information;
   a color conversion processing unit that performs a color conversion process according to the brightness information with respect to the display information so that the display image can be color-reproduced within a predetermined color space, the color conversion processing unit performs the color conversion process with respect to the display information such that the display information can also be subjected to a gray-scale characteristic correction process corresponding to a gray-scale characteristic of an optical modulation element; and
   a display and driving unit that drives the optical modulation element based on the display information having been subjected to the color conversion process to display the display image wherein, when the color conversion processing unit performs the color conversion process, the color conversion processing unit calculates each output pixel value for making the display image color-reproduced within the predetermined color space by using the brightness information and each input pixel value for each color, which correspond to each pixel, included in the display information based on a color conversion function using the brightness information and each input pixel value for each color as conversion parameters.

3. An image display device having an optical modulation element, which modulates light emitted from a light source according to display information, and displaying a display image based on the display information, the image display device comprising:
   a unit adjusting an amount of illumination light with respect to light emitted from a light source based on brightness information on brightness of a display image based on a display information;
   a color conversion processing unit that performs a color conversion process according to the brightness information with respect to the display information so that the display image can be color-reproduced within a predetermined color space;
   a display and driving unit that drives an optical modulation element based on the display information having been subjected to the color conversion process so as to display the display image; and
   a gray-scale characteristic correction processing unit that performs a gray-scale characteristic correction process, which corresponds to a gray-scale characteristic of the optical modulation element, with respect to the display information,
   wherein the gray-scale characteristic correction processing unit performs the gray-scale characteristic correction process corresponding to the brightness information.

4. The image display device according to claim 3, further comprising:
   a gray-scale range change processing unit that performs a gray-scale range change process of changing the gray-scale range of the display information by increasing each pixel value, corresponding to each pixel, included in the display information based on the brightness information,
   wherein the display and driving unit drives the optical modulation element based on the display information having been subjected to the gray-scale range change process and the color conversion process to display the display image.

5. The image display device according to claim 3,
   wherein, when the color conversion processing unit performs the color conversion process, the color conversion processing unit calculates each output pixel value for making the display image color-reproduced within the predetermined color space by using the brightness information and each input pixel value for each color, which correspond to each pixel, included in the display information based on a color conversion function using the brightness information and each input pixel value for each color as conversion parameters.

* * * * *